(12) United States Patent
Bofinger et al.

(10) Patent No.: US 8,003,254 B2
(45) Date of Patent: Aug. 23, 2011

(54) BATTERY CATHODES

(75) Inventors: Todd E. Bofinger, Nashua, NH (US); William L. Bowden, Nashua, NH (US); George Cintra, Holliston, MA (US); Kirakodu S. Nanjundaswamy, Sharon, MA (US); Rimma A. Sirotina, Ashland, MA (US); Dana Alexa Totir, Danbury, CT (US); Fan Zhang, Norwood, MA (US)

(73) Assignee: The Gillette Company, Boston, MA (US)

( * ) Notice: Subject to any disclaimer, the term of this patent is extended or adjusted under 35 U.S.C. 154(b) by 1247 days.

(21) Appl. No.: 10/951,936

(22) Filed: Sep. 28, 2004

(65) Prior Publication Data
US 2005/0164086 A1   Jul. 28, 2005

Related U.S. Application Data

(63) Continuation-in-part of application No. 10/761,415, filed on Jan. 22, 2004, now abandoned.

(51) Int. Cl.
*H01M 4/50* (2010.01)
*H01M 4/13* (2010.01)

(52) U.S. Cl. ................. 429/224; 429/218.1; 429/231.9; 429/231.95

(58) Field of Classification Search .................. 429/128, 429/209, 218.1, 224, 231.9, 231.95
See application file for complete search history.

(56) References Cited

U.S. PATENT DOCUMENTS

| | | | |
|---|---|---|---|
| 345,124 | A | 7/1886 | DeVirloy et al. |
| 4,133,856 | A | 1/1979 | Ikeda et al. |
| 4,279,972 | A | 7/1981 | Moses |
| 4,401,735 | A | 8/1983 | Moses et al. |
| 4,526,846 | A | 7/1985 | Kearney et al. |
| 4,560,631 | A | 12/1985 | Nishihama et al. |
| 4,758,484 | A | 7/1988 | Furukawa et al. |
| 4,904,552 | A | 2/1990 | Furukawa et al. |
| 4,921,689 | A | 5/1990 | Walker et al. |
| 4,959,282 | A | 9/1990 | Dahn et al. |
| 5,156,933 | A | 10/1992 | Yamaguchi et al. |
| 5,277,890 | A | 1/1994 | Wang et al. |
| 5,348,726 | A | 9/1994 | Wang et al. |
| 5,391,365 | A | 2/1995 | Wang et al. |
| 5,482,796 | A | 1/1996 | Wang et al. |
| 5,523,073 | A | 6/1996 | Sumida et al. |
| 5,532,084 | A | 7/1996 | Wang et al. |
| 5,595,841 | A | 1/1997 | Suzuki |

(Continued)

FOREIGN PATENT DOCUMENTS
EP   0 037 053   3/1981
(Continued)

OTHER PUBLICATIONS

Bowden, et al., "Lithiation of HEMD: NMR, XRD, TEM and Electrochemical Investigation of the Discharge Mechanism," ITE Letters, 3, B1 (2002), 312-336.

(Continued)

*Primary Examiner* — Helen O Conley
(74) *Attorney, Agent, or Firm* — Fish & Richardson P.C.

(57) ABSTRACT

Batteries are disclosed. In some embodiments, a battery includes a cathode having a composition that includes a manganese oxide. The composition has an X-ray diffraction pattern with a first peak at about 18 degrees, a second peak at about 22 degrees, and a third peak at about 32 degrees.

37 Claims, 25 Drawing Sheets

U.S. PATENT DOCUMENTS

| | | | |
|---|---|---|---|
| 5,658,693 A * | 8/1997 | Thackeray et al. | ............ 429/224 |
| 5,698,176 A | 12/1997 | Capparella et al. | |
| 5,863,675 A | 1/1999 | Capparella et al. | |
| 6,004,526 A | 12/1999 | Sugimoto et al. | |
| 6,123,911 A | 9/2000 | Yamaguchi et al. | |
| 6,190,800 B1 * | 2/2001 | Iltchev et al. | ................. 429/224 |
| 6,383,683 B1 | 5/2002 | Nagayama et al. | |
| 6,403,257 B1 | 6/2002 | Christian et al. | |
| 6,409,985 B1 | 6/2002 | Numata et al. | |
| 6,440,181 B1 | 8/2002 | Bowden et al. | |
| 6,465,130 B1 | 10/2002 | Numata et al. | |
| 6,576,215 B1 | 6/2003 | Numata et al. | |
| 6,706,444 B1 | 3/2004 | Numata et al. | |
| 6,821,678 B2 | 11/2004 | Sumida et al. | |
| 2001/0024752 A1 | 9/2001 | Sumida et al. | |
| 2003/0035997 A1 | 2/2003 | Numata et al. | |
| 2004/0076881 A1 | 4/2004 | Bowden et al. | |
| 2005/0112467 A1 | 5/2005 | Berkowitz et al. | |

FOREIGN PATENT DOCUMENTS

| | | |
|---|---|---|
| EP | 0373791 B1 | 4/1994 |
| EP | 0 624 552 | 11/1994 |
| EP | 0675079 B1 | 7/1999 |
| EP | 1043275 A1 | 10/2000 |
| EP | 1074514 | 2/2001 |
| EP | 1094034 A1 | 4/2001 |
| EP | 1394876 A1 | 3/2004 |
| EP | 1128452 A1 | 4/2005 |
| EP | 1128452 B1 | 4/2005 |
| WO | WO 99/59215 | 11/1990 |
| WO | WO00/06496 | 2/2000 |
| WO | WO00/32518 | 6/2000 |
| WO | WO00/61495 | 10/2000 |
| WO | WO02/084765 | 10/2002 |

OTHER PUBLICATIONS

Hill, L.I. et al., "Electrochemical Synthesis of Beta- and Gamma-Manganese Dioxides under Hydrothermal Conditions," Electrochem. Solid-State Lett., vol. 4, 2001, pp. D1-D3.

Read, J. et al., "Low Temperature Performance of $\lambda$-MnO$_2$ in Lithium Primary Batteries," Electrochem. Solid State Lett., vol. 4, 2001, pp. A162-5.

Iltchev et al., "Lithiated Manganese Dioxide fro Primary LiMnO$_2$ Batteries", ITE Letters on Batteries, New Techologies & Medicine, vol. 2, No. 3, pp. 52-61 (2001).

Larcher, D. et al., "Low Temperature Synthesis of $\gamma$-Li$^x$MnO$_2$ Powders in Ethylene Glycol," International Journal of Inorganic Materials, vol. 4, 2000, pp. 389-396.

Thackeray, M.M., "Manganese Oxides for Lithium Batteries," Prog. Solid St. Chem., vol. 25, pp. 1-71, 1997.

Thackeray, M.M., "Manganese Oxides for Lithium Batteries", Progress in Batteries & Battery Materials, vol. 14 (1995), 1-85.

Hunter, J.C., "Preparation of a New Crystal Form of Manganese Dioxide: $\lambda$-MnO$_2$," J. Solid State Chemistry, vol. 39, 1981, pp. 142-147.

Bowden, W. et al., "Lithiation of Ramsdellite-Pyrolusite MnO$_2$; NMR, XRD, TEM and Electrochemical Investigation of the Discharge Mechanism", *ITE Letters on Batteries, New Technologies & Medicine*, vol. 5, No. 3 (2004), 16-24.

Bowden, W. et al., "Manganese Dioxide for Alkaline Zinc Batteries: A Single-Phase Model", *ITE Letters on Batteries, New Technologies & Medicine*, vol. 4, No. 1 (2003), 26-37.

Bowden, W. et al., "Manganese Dioxide for Alkaline Zinc Batteries: Why Electrolytic MNO$_2$?", *ITE Letters on Batteries, New Technologies & Medicine*, vol. 1, No. 6 (2000), 53-64.

Bowden, W. et al., "Lithiation of HEMD: NMR, XRD, TEM and Electrochemical Investigation of the Discharge Mechanism", *ITE Letters on Batteries, New Technologies & Medicine*, vol. 3, No. 3 (2002), 26-50.

Bowden, W. et al., "Reduction of $\gamma$-MnO$_2$ in Deuterium Media; MAS NMR and Electrochemical Studies", *ITE Letters on Batteries, New Technologies & Medicine*, vol. 4, No. 2 (2003), 19-28.

Bowden, W. et al., "Lithiation of Ramsdellite-Pyrolusite MnO$_2$; NMR, XRD, TEM and Electrochemical Investigation of the Discharge Mechanism", *Battery and Fuel Cell Materials*, Extended Abstracts of the Battery and Fuel Cell Materials Smposium (Austria), Apr. 18-22, 2004, 109-110.

Burns, R. et al., "Structural Relationships Between the Manganese (IV) Oxides", Manganese Dioxide Symposium, Cleveland, Ohio (1975), 306-327.

Chabre, Y. et al., "Structural and Electrochemical Properties of the Proton/$\gamma$-MnO$_2$ System", *Prog. Solid St. Chem.*, vol. 23 (1995), 1-130.

Falk & Salkind, "Alkaline Storage Batteries", John Wiley & Sons, Inc., 1969, pp. 1-41.

Linden, D., *Handbook of Batteries*, (McGraw-Hill, 2d ed. 1995), "1.4 Classification of Cells and Batteries", pp. 1.9-1.11; "7.1 General Characteristics and Applications of Primary Batteries", pp. 7.3-7.7; "23.1 General Characteristics and Applications of Secondary Batteries", pp. 23.3-23.12.

Shen, X. et al., "Phase Transitions and Ion Exchange Behavior of Electrolytically Prepared Manganese Dioxide", *Journal of Solid State Chemistry 64*, 270-282 (1986).

Thompson, A.H., "Electrochemical Potential Spectroscopy: A New Electrochemical Measurement", *J. Electrochem. Soc.* (Apr. 1979), 608-616.

Bofinger et al., U.S. Appl. No. 10/761,415, filed Jan. 22, 2004.

Bowden et al., U.S. Appl. No. 11/123,428, filed May 6, 2005.

Berkowitz et al., U.S. Appl. No. 10/675,512, filed Sep. 30, 2003.

Totir et al., U.S. Appl. No. 10/800,905, filed Mar. 15, 2004.

* cited by examiner

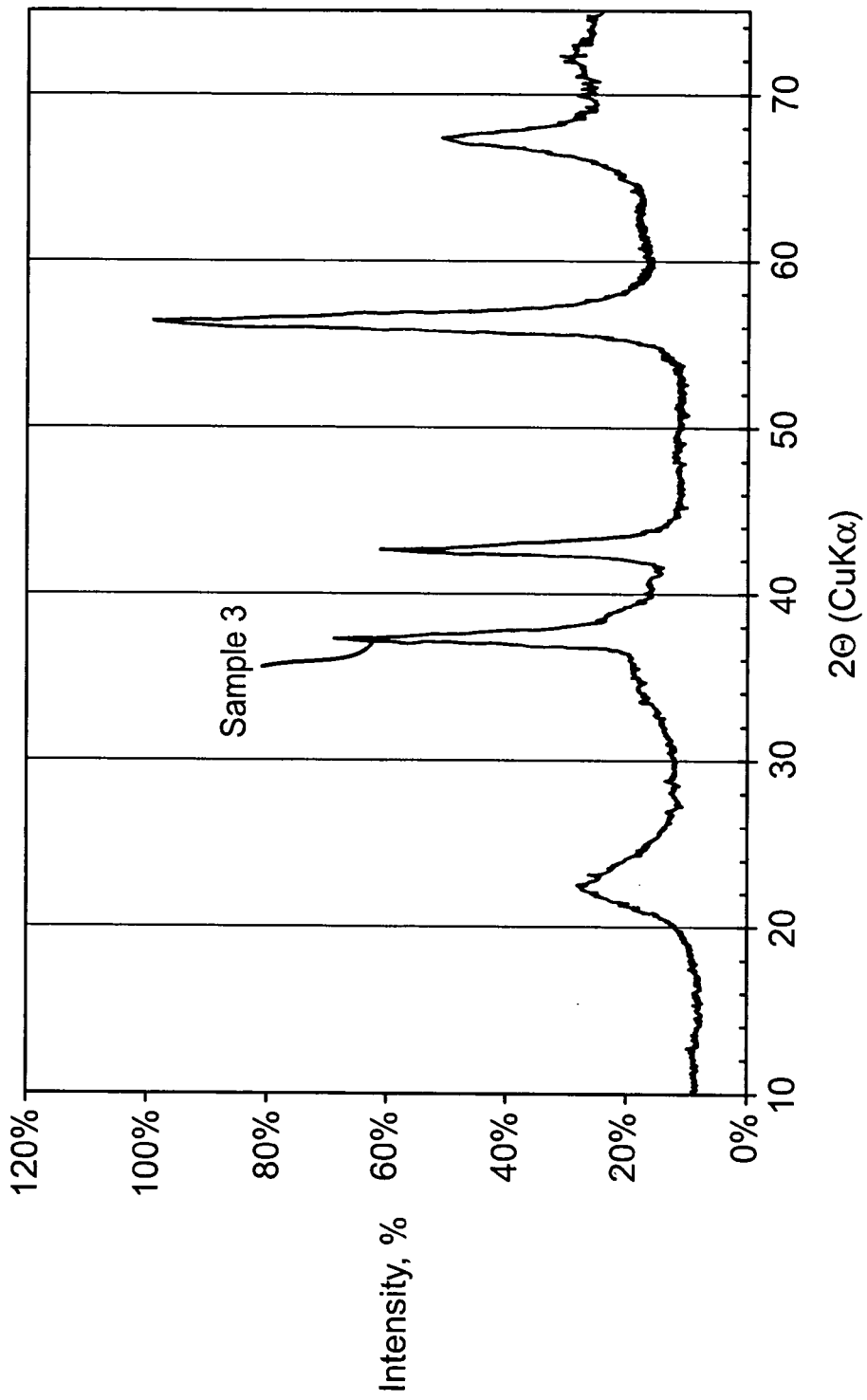

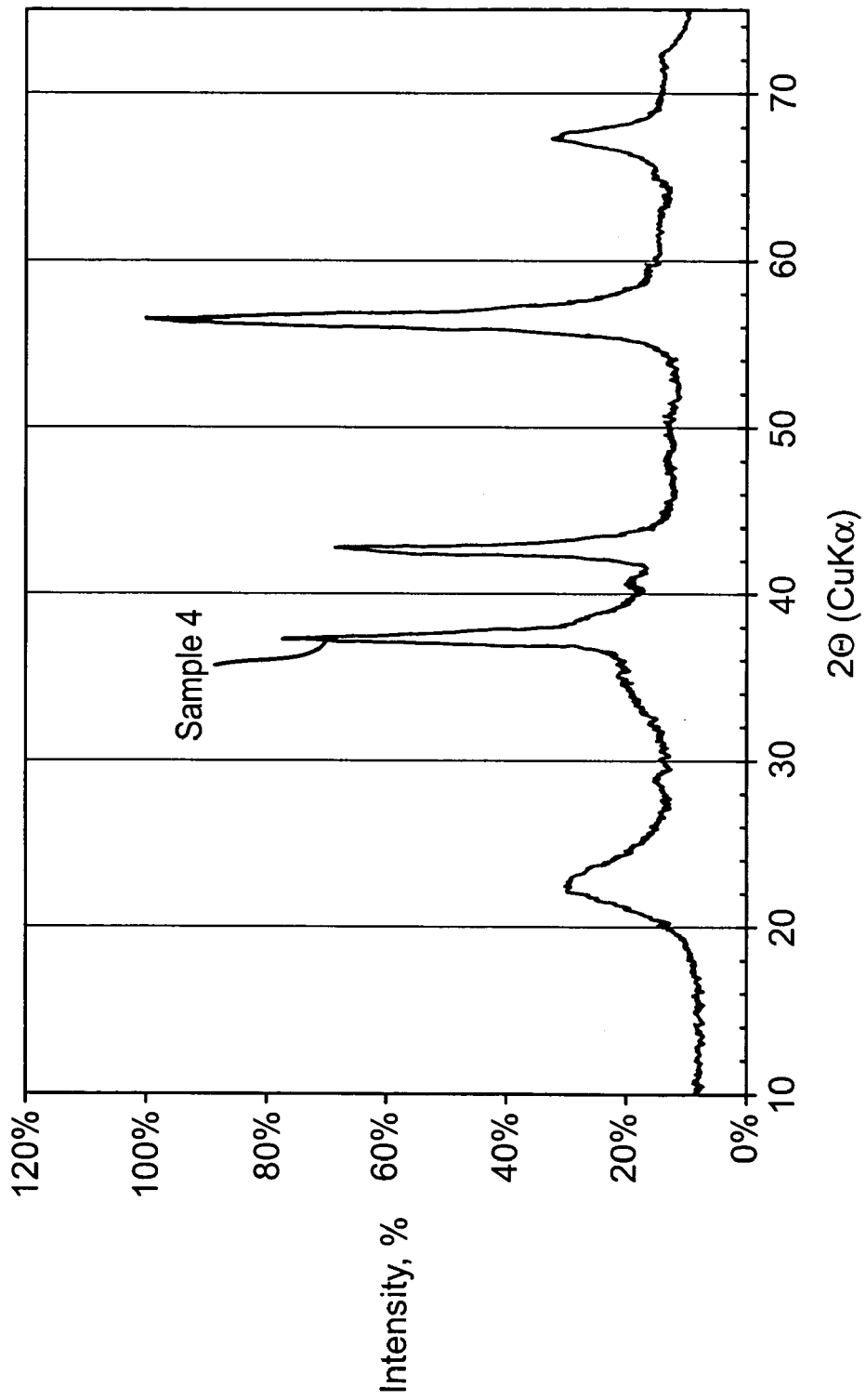

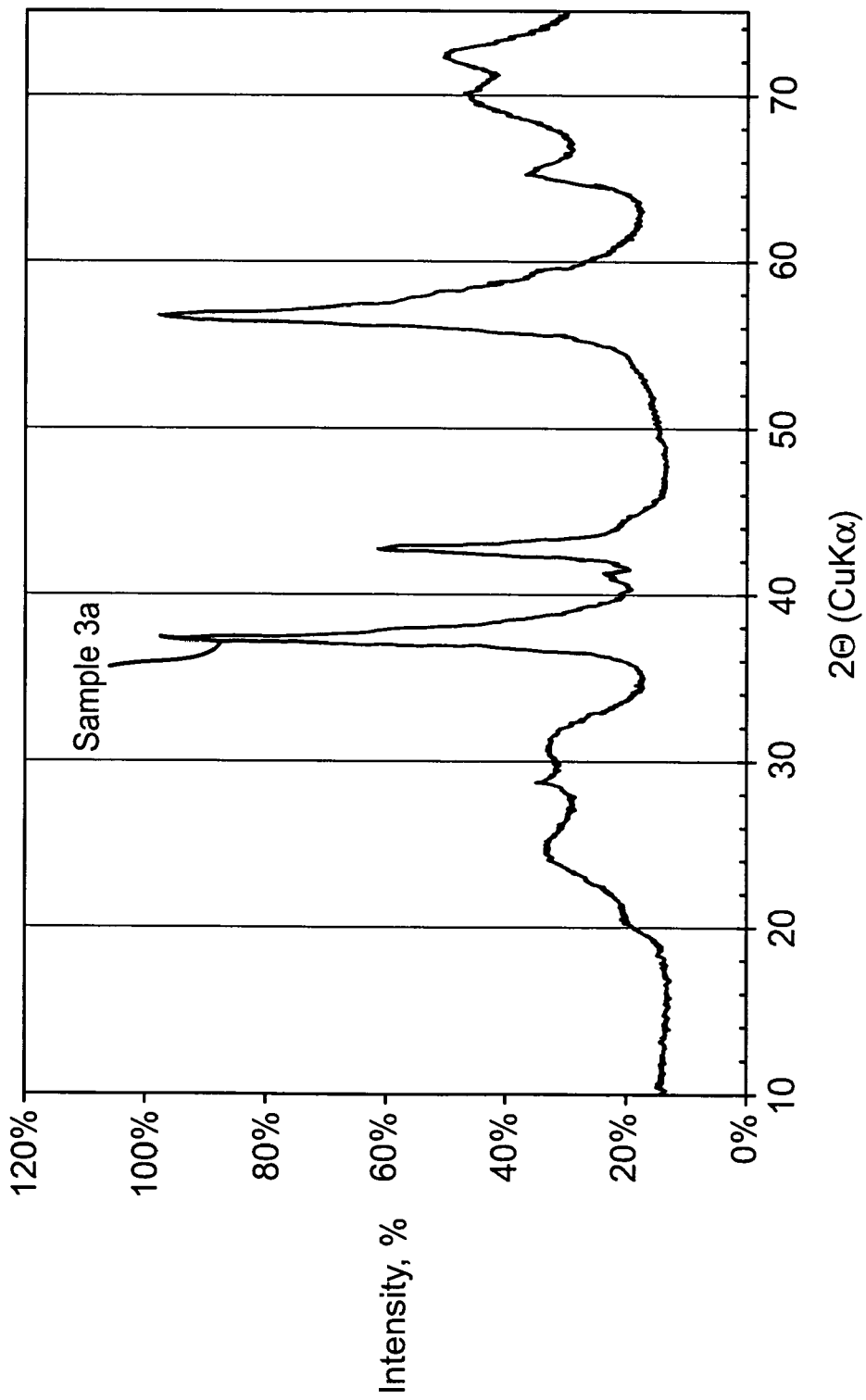

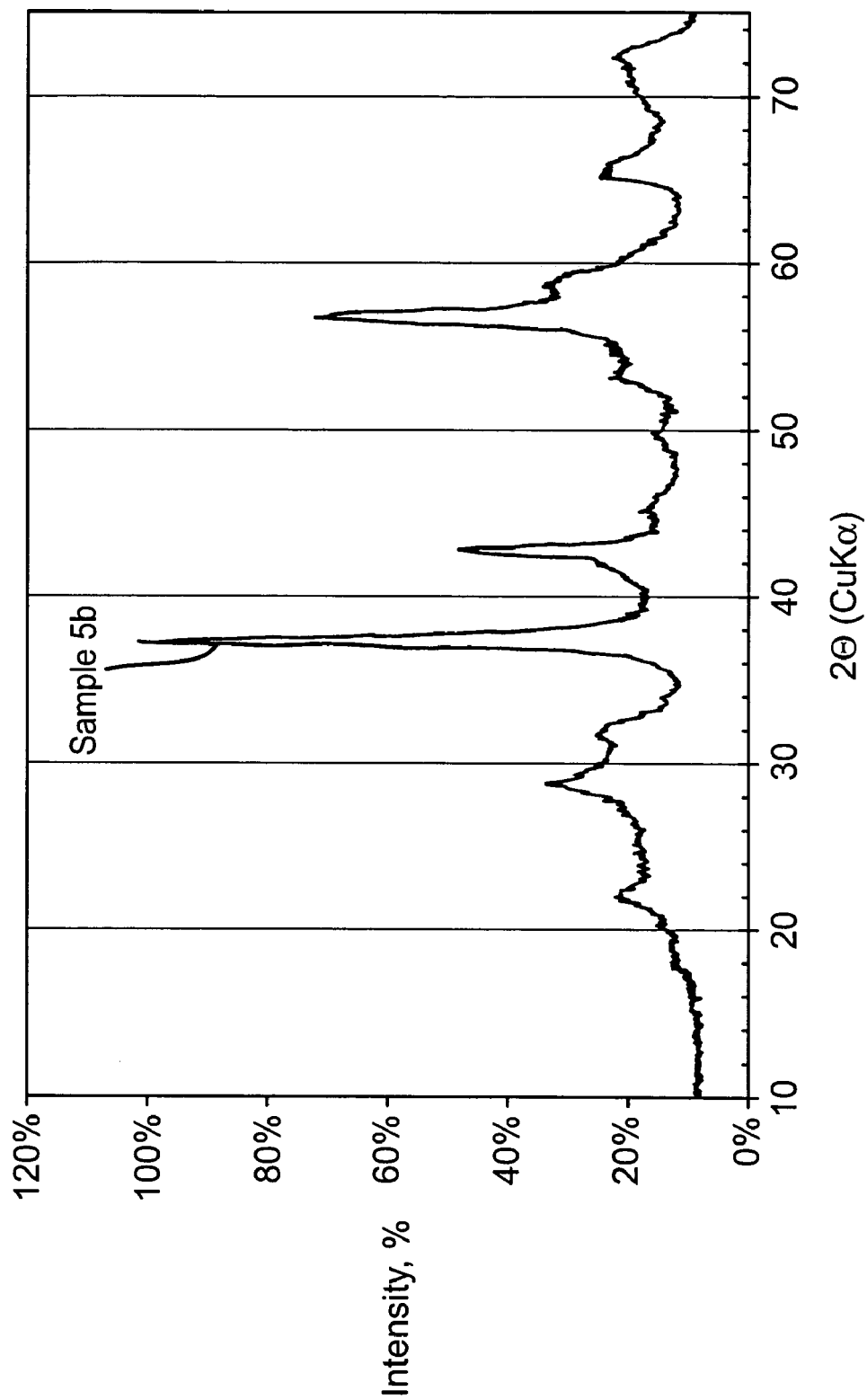

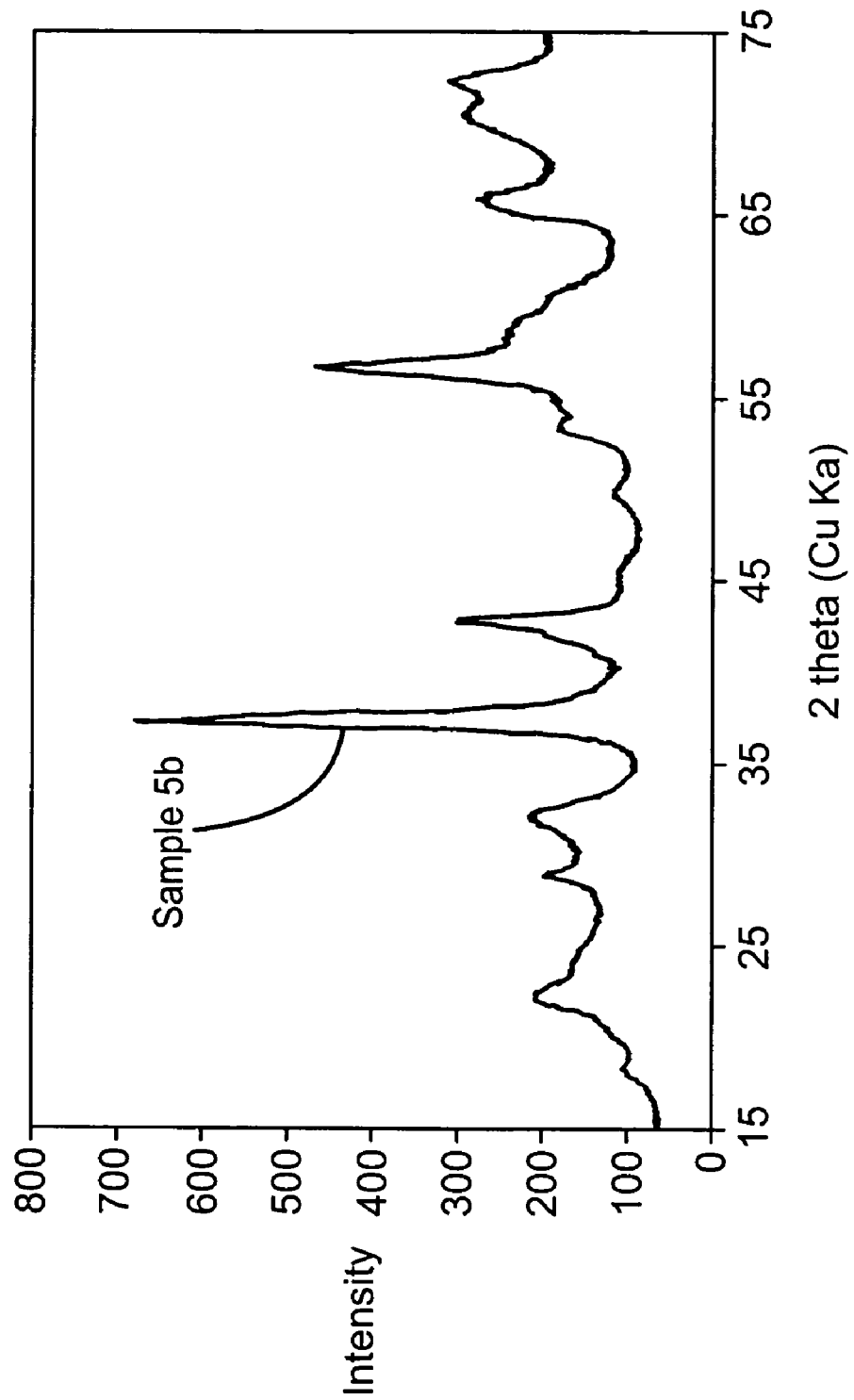

BATTERY CATHODES

CROSS-REFERENCE TO RELATED APPLICATIONS

This application is a continuation-in-part of, and claims priority under 35 U.S.C. §120 to, U.S. patent application Ser. No. 10/761,415, filed on Jan. 22, 2004, and entitled "Cathode Material for Lithium Battery" currently abandoned, which is incorporated herein by reference in its entirety.

TECHNICAL FIELD

The invention relates to batteries, as well as to related compositions and methods.

BACKGROUND

Batteries or electrochemical cells are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

SUMMARY

The invention relates to batteries, as well as to related compositions and methods.

In one aspect, the invention relates to a cathode active material that can be used in a cathode of a battery, such as a lithium battery. A battery that includes the cathode active material can have a relatively low surface area, and thus can experience reduced gas evolution (e.g., during storage) relative to a comparable battery with a different cathode active material. Thus, a battery that includes the cathode active material can be less likely to rupture and/or leak than a comparable battery that does not include the cathode active material. Furthermore, a battery that includes the cathode active material may be operated without a pre-discharge step to control gassing, which can result in a decrease in cell capacity and can complicate manufacture. A battery that includes the cathode active material can also experience enhanced electrical performance (e.g., it can exhibit enhanced capacity on high drains). A smaller amount of the cathode active material may be used in a battery to achieve an electrical performance that is comparable to the electrical performance of another battery that includes a higher amount of a different cathode active material. Thus, a battery that includes the cathode active material may have more space available for other battery components than a comparable battery that does not include the cathode active material.

In another aspect, the invention features a battery with a cathode including a composition with an X-ray diffraction pattern that has one peak at about 18 degrees, a second peak at about 22 degrees, and a third peak at about 32 degrees. The composition includes a manganese oxide.

In a further aspect, the invention features a battery with a cathode including a composition with an X-ray diffraction pattern that has one peak at about 18 degrees and a second peak at about 22 degrees. The composition also has a Lithium NMR spectrum with a peak at about 550 ppm. The composition includes a manganese oxide.

In an additional aspect, the invention features a method of making a battery. The method includes heating a manganese oxide in an atmosphere of greater than about 21 percent oxygen, and incorporating the manganese oxide in a cathode of the battery.

In a further aspect, the invention features an electrochemical cell that includes a housing, within which are an electrolyte, an anode and a cathode. The anode contains lithium or an alloy including lithium. The cathode contains a composition of matter including a manganese oxide, and has an X-ray diffraction pattern with one peak at about 18 degrees, a second peak at about 22 degrees, and a third peak at about 32 degrees.

In another aspect, the invention features a method of making a battery, the method including lithiating a manganese oxide at a temperature of at least about 40° C., and incorporating the manganese oxide in a cathode of the battery.

In an additional aspect, the invention features a composition including a manganese oxide and having an X-ray diffraction pattern that includes a first peak at about 18 degrees, a second peak at about 22 degrees, and a third peak at about 32 degrees.

In another aspect, the invention features a composition including a manganese oxide and having an X-ray diffraction pattern that includes a first peak at about 18 degrees and a second peak at about 22 degrees. The composition also has a Lithium NMR spectrum with a peak at about 550 ppm.

In a further aspect, the invention features a method of making a cathode, the method including heating a manganese oxide in an atmosphere of greater than about 21 percent oxygen to form the cathode.

Embodiments can include one or more of the following features.

The battery can be a primary battery or a secondary battery.

The composition can further include lithium. The composition can have the formula $Li_xMnO_y$, in which $0.05 \leq x \leq 0.25$ and $1.8 \leq y \leq 2.0$. In some embodiments, the composition can have this formula prior to discharge of the battery. In certain embodiments, $0.1 \leq x \leq 0.25$ (e.g., $0.15 \leq x \leq 0.25$). In some embodiments, $1.9 \leq y \leq 2.0$ or $1.85 \leq y \leq 1.95$.

The composition can have a BET surface area of about 25 m²/gram or less (e.g., from about 11 m²/gram to about 25 m²/gram). The composition can have a BET surface area of about 11 m²/gram.

The X-ray diffraction pattern of the composition can include a peak at about 32 degrees. In some embodiments, the X-ray diffraction pattern of the composition can include a peak at about 41.6 degrees and a peak at about 42.6 degrees. The X-ray diffraction pattern of the composition can include a peak at about 54 degrees and/or a peak at about 28 degrees. In certain embodiments, the X-ray diffraction pattern of the composition can include a peak at about 37 degrees. The X-ray diffraction pattern of the composition can include a peak at about 24 degrees.

The manganese oxide can be substantially free of pyrolusite. The manganese oxide can include ramsdellite. The manganese oxide can include manganese with a formal oxidation state of from about +3.0 to about +4.0 (e.g., about +3.9). The manganese oxide can be manganese dioxide (e.g., electrolytic manganese dioxide). The manganese oxide can include lithium.

The cathode can have a capacity of at least about 150 mAh/gram (e.g., from about 250 mAh/gram to about 350 mAh/gram).

The battery can have an open-circuit voltage and/or a closed-circuit voltage of at least about 1.5 Volts. The battery can have a current capability of up to about 20 amperes.

The anode can include a lithium-aluminum alloy.

The electrolyte can include ethylene carbonate, propylene carbonate, 1,2-dimethoxyethane, or a combination thereof.

The method can include heating the manganese oxide in an atmosphere of from about 60 percent to about 100 percent oxygen.

The method can include heating the manganese oxide at a temperature of from about 300° C. to about 500° C. (e.g., from about 400° C. to about 500° C., from about 440° C. to about 490° C., from about 445° C. to about 455° C.). The method can include heating the manganese oxide at a temperature of about 450° C. The method can include heating the manganese oxide for at most about 48 hours (e.g., from about six hours to about 12 hours). The method can include heating the manganese oxide for about one hour.

After being heated, the manganese oxide can have the formula $Li_xMnO_y$, in which $0.05 \leq x \leq 0.25$ and $1.8 \leq y \leq 2.0$. In some embodiments, $0.1 \leq x \leq 0.25$ (e.g., $0.15 \leq x \leq 0.25$). In certain embodiments, $1.9 \leq y \leq 2.0$ or $1.85 \leq y \leq 1.95$.

Prior to being heated, the manganese oxide can have the formula $Li_xMnO_2$, and x can be at least about 0.11. In some embodiments, x can be at most about 0.5 (e.g., at most about 0.25). In certain embodiments, the manganese oxide can have the formula $Li_{0.11}MnO_2$, prior to being heated.

The method can further include lithiating the manganese oxide prior to heating the manganese oxide. Lithiating the manganese oxide can include contacting the manganese oxide with a salt such as lithium nitrate, lithium carbonate, lithium chloride, or lithium bromide. Lithiating the manganese oxide can include contacting the manganese oxide with lithium hydroxide. The method can include lithiating the manganese oxide at a temperature of at least about 30° C. (e.g., at least about 40° C., at least about 50° C.). In some embodiments, the manganese oxide can be lithiated at a temperature of about 100° C. or higher (e.g., under hydrothermal conditions). In certain embodiments, the manganese oxide can be lithiated at a temperature of from about 40° C. to about 150° C. (e.g., from about 50° C. to about 120° C.). In some embodiments, the method can include lithiating the manganese oxide at a temperature of about 60° C., about 80° C., or about 100° C.

Other aspects, features, and advantages of the invention are in the drawings, description, and claims.

DESCRIPTION OF DRAWINGS

FIGS. 4a-4e show X-ray diffraction patterns of lithiated manganese oxide samples.

FIGS. 5a-5e show X-ray diffraction patterns of the lithiated manganese oxide samples of FIGS. 4a-4e, respectively, after the samples have been heated at about 350° C. in air.

FIGS. 6a-6e show X-ray diffraction patterns of the lithiated manganese oxide samples of FIGS. 4a-4e, respectively, after the samples have been heated at about 450° C. in an oxygen atmosphere.

FIGS. 9a and 9b show X-ray diffraction patterns of lithiated manganese oxide samples that have been heated at about 450° C. in an oxygen atmosphere.

DETAILED DESCRIPTION

Figure 1:
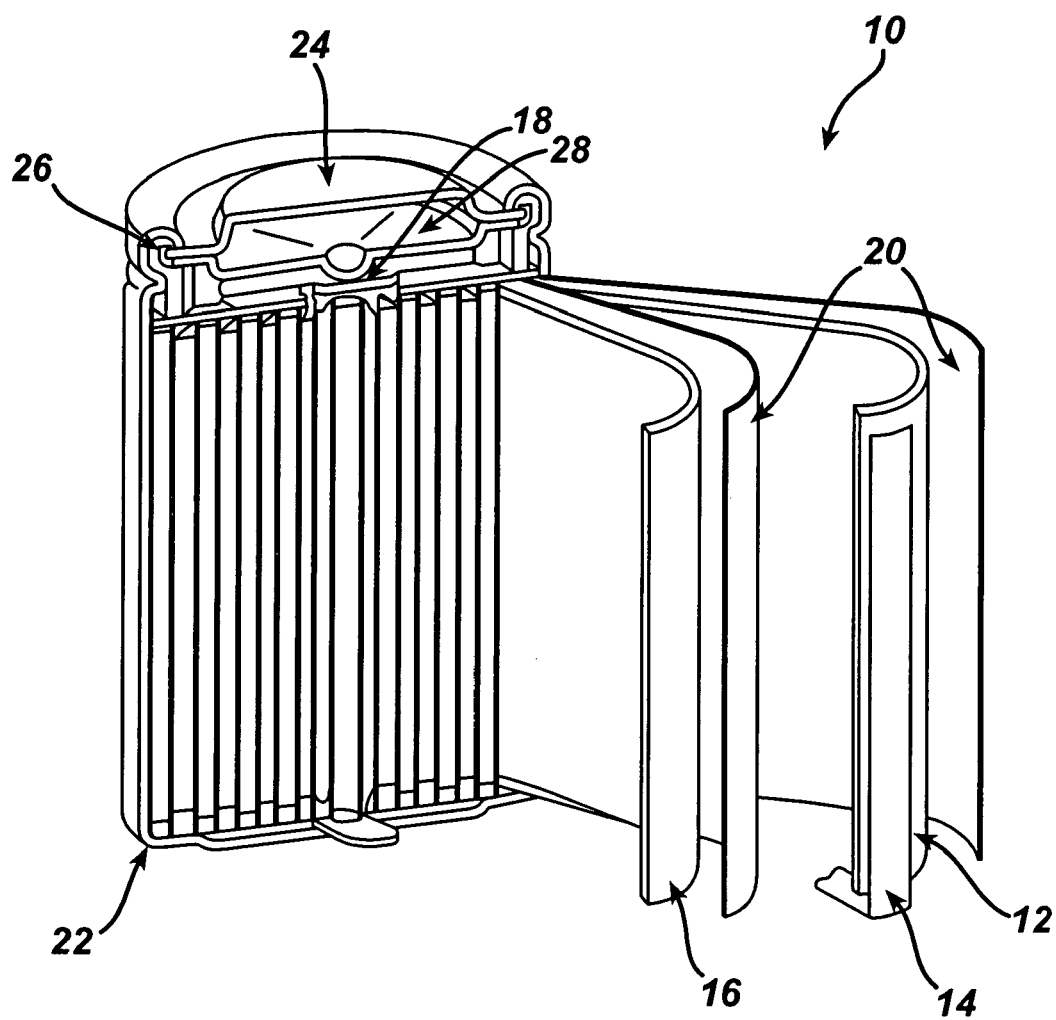
FIG. 1 is a sectional view of a nonaqueous electrochemical cell.

Referring to FIG. 1, a primary electrochemical cell 10 includes an anode 12 in electrical contact with a negative lead 14, a cathode 16 in electrical contact with a positive lead 18, a separator 20 and an electrolytic solution. Anode 12, cathode 16, separator 20 and the electrolytic solution are contained within a case 22. The electrolytic solution includes a solvent system and a salt that is at least partially dissolved in the solvent system. Electrochemical cell 10 further includes a cap 24 and an annular insulating gasket 26, as well as a safety valve 28.

In some embodiments, cathode 16 includes as a cathode active material a lithium manganese oxide composition (e.g., nominally $Li_xMnO_2$) that is capable of enhancing the performance of cell 10. For example, the lithium manganese oxide can enhance the capacity of cell 10. Furthermore, as described below, the lithium manganese oxide can be characterized as having a relatively low BET surface area, which can result in reduced gas evolution and a reduced likelihood of cell leakage. The lithium manganese oxide also can be characterized as having a relatively high pore volume and thus a relatively high electrochemically active surface area. The result of the lithium manganese oxide having a relatively high pore volume can be a decrease in polarization of the cell during discharge, and a corresponding increase in battery life. Alternatively or additionally, the lithium manganese oxide can be characterized as having a relatively high average pore diameter. A lithium manganese oxide with a relatively high average pore diameter can provide improved electrolyte access to the lithium manganese oxide, and lessened concentration polarization (a more even distribution of electrolyte). As a result, the cell can provide a relatively high running voltage during a high current discharge (e.g., as a result of a relatively large load on the cell, such as a digital camera).

The lithium manganese oxide is nominally represented by the formula $Li_xMnO_y$, where $0.05 \leq x \leq 0.25$ and $1.8 \leq y \leq 2.0$. In some embodiments, x can be at least 0.05 (e.g., at least about 0.1, at least about 0.15, at least about 0.17, at least about 0.2), and/or at most 0.25 (e.g., at most about 0.2, at most about 0.17, at most about 0.15, at most about 0.1). Alternatively or additionally, y can be at least about 1.8 (e.g., at least about 1.85, at least about 1.9, at least about 1.95), and/or at most about 2.0 (e.g., at most about 1.95, at most about 1.9, at most about 1.85). The empirical composition of the lithium manganese oxide can be determined by elemental analysis.

In some embodiments, such as when the lithium manganese oxide is non-stoichiometric, the lithium manganese oxide can be characterized by the formal oxidation state of the manganese. In certain embodiments, the formal oxidation state of the manganese can be at least about +3.0 (e.g., at least about +3.1, at least about +3.2, at least about +3.3, at least about +3.4, at least about +3.5, at least about +3.6, at least about +3.7, at least about +3.8, at least about +3.9), and/or at most about +4.0 (e.g., at most about +3.9, at most about +3.8, at most about +3.7, at most about +3.6, at most about +3.5, at most about +3.4, at most about +3.3, at most about +3.2, at most about +3.1). For example, the manganese can have a formal oxidation state of from about +3.9 to about +4.0 (e.g., about +3.9).

Figure 2:
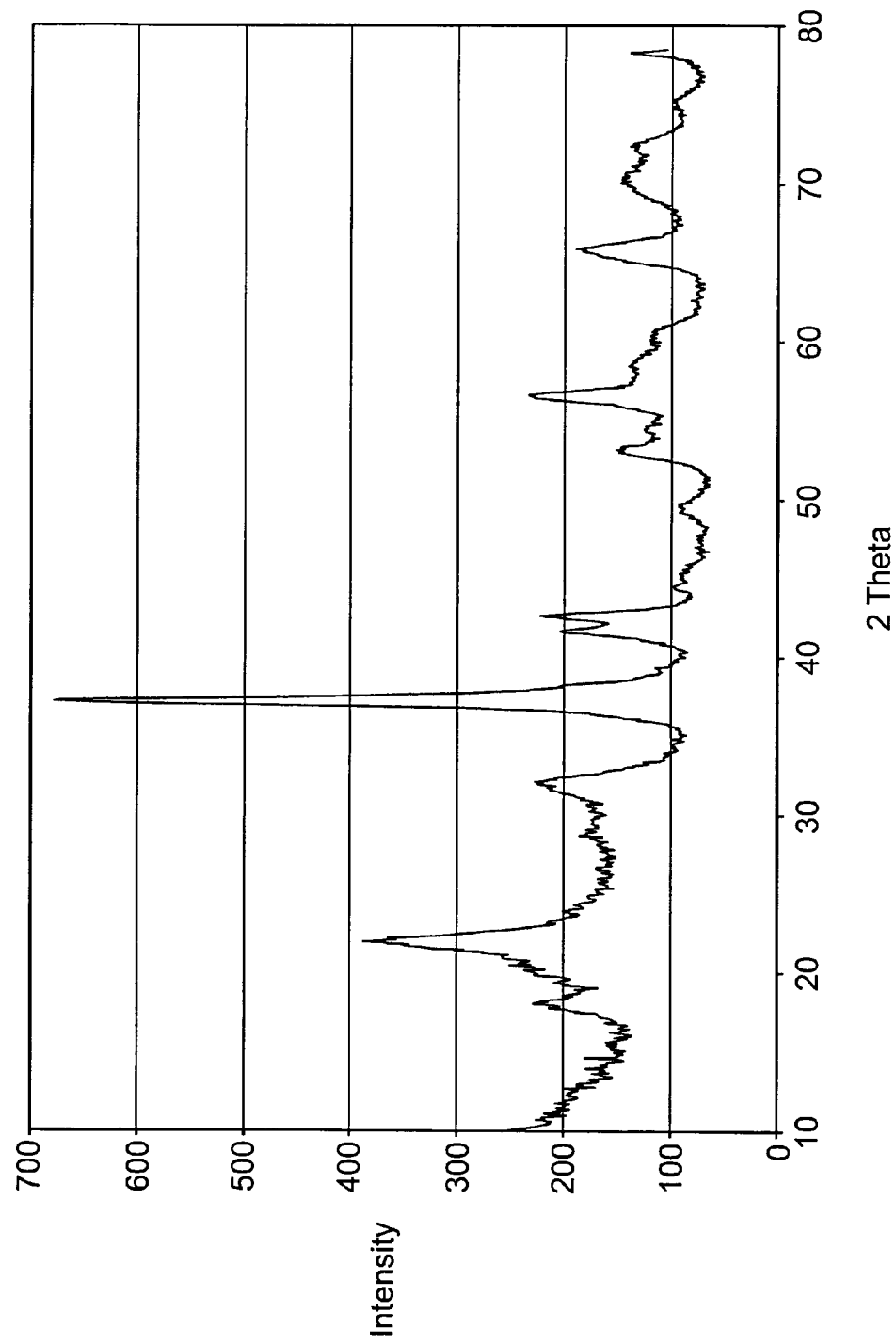
FIG. 2 shows an X-ray diffraction pattern of an embodiment of a cathode active material.

The lithium manganese oxide can also be identified by a characteristic X-ray diffraction pattern. Referring to FIG. 2, the X-ray diffraction pattern can include a peak at about 37 degrees (100 percent). The X-ray diffraction pattern can include peaks at about 18 degrees (34 percent) and about 22 degrees (57 percent). The X-ray diffraction pattern can further include peaks at about 32 degrees (33 percent), about 41.6 degrees (30 percent), about 42.6 degrees (33 percent), and/or about 54 degrees (24 percent). In certain embodiments, the X-ray diffraction pattern can include a peak at about 57 degrees (35 percent). In certain embodiments, the X-ray diffraction pattern can include a peak at about 18 degrees (34 percent), a peak at about 22 degrees (57 percent), and a peak at about 32 degrees (33 percent).

In certain embodiments, the lithium manganese oxide has an X-ray diffraction pattern with a peak at about 28 degrees (25 percent). Without wishing to be bound by theory, it is believed that an X-ray diffraction peak at about 28 degrees is indicative of the presence of pyrolusite in the lithium manganese oxide. In certain embodiments, the lithium manganese oxide can be substantially free of pyrolusite, such that an X-ray diffraction pattern of the lithium manganese oxide has either an insignificant peak at about 28 degrees (a 28-degree peak having a relative intensity of less than about 5 percent), or no observable peak at about 28 degrees. As the amount of pyrolusite in the lithium manganese oxide decreases, the surface area of the lithium manganese oxide, and thus the extent of gassing by the lithium manganese oxide, can also decrease.

In some embodiments, the lithium manganese oxide has an X-ray diffraction pattern with a peak at about 24 degrees (57 percent). Without wishing to be bound by theory, it is believed that an X-ray diffraction peak at about 24 degrees is indicative of the presence of ramsdellite in the lithium manganese oxide. As the amount of ramsdellite in the lithium manganese oxide increases, the discharge voltage and current capability of cell 10 can increase.

The X-ray diffraction pattern of the lithium manganese oxide can be affected by the particular process used to form the oxide. For example, as described below, in some embodiments, the lithium manganese oxide can be formed by lithiating a manganese oxide (i.e., inserting lithium ions into the crystal lattice of the manganese oxide), and subsequently heat treating the lithiated manganese oxide. It is believed that the particular phase of lithium manganese oxide that is formed is dependent on, for example, the temperature at which lithiation is performed, the final concentration of lithium in the oxide, the heat treatment protocol, and/or the concentration of oxygen in the heat treatment environment. As an example, as the temperature of lithiation increases, the extent of lithium uptake by the manganese oxide can also increase. Thus, the final lithium manganese oxide can have a relatively high lithium content, which can also cause it to have a relatively high capacity. As another example, as the temperature of lithiation increases, the amount of protons present in the final lithium manganese oxide, and thus to extent of gassing by the final lithium manganese oxide, can decrease. As a further example, as the concentration of oxygen in the heat treatment environment increases, the surface area of the final lithium manganese oxide can decrease (and, therefore, the extent of gassing by the final lithium manganese oxide can also decrease).

Figure 3:
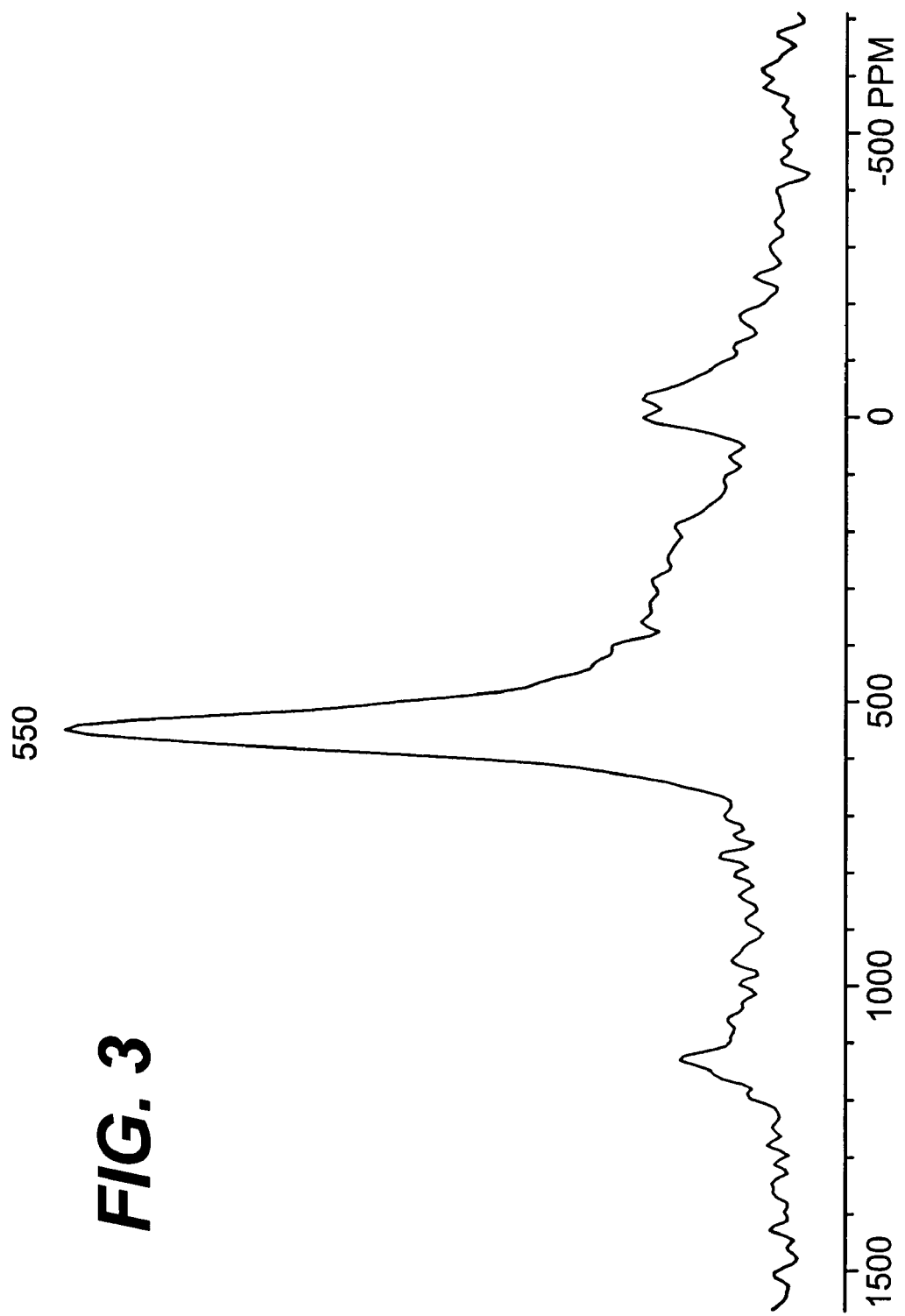
FIG. 3 shows a Lithium NMR spectrum of an embodiment of a cathode active material.
Figure 4A:
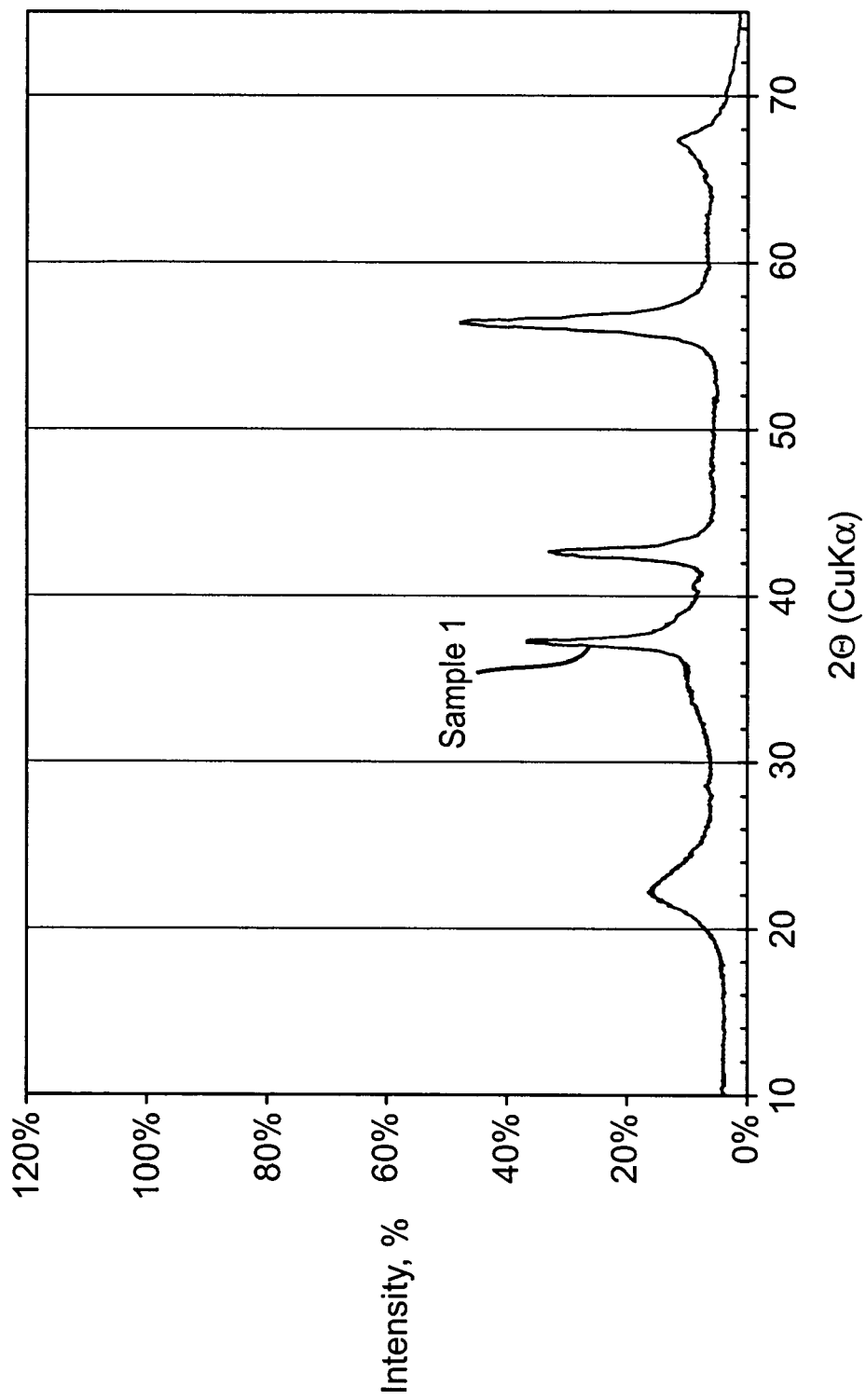
Figure 4B:
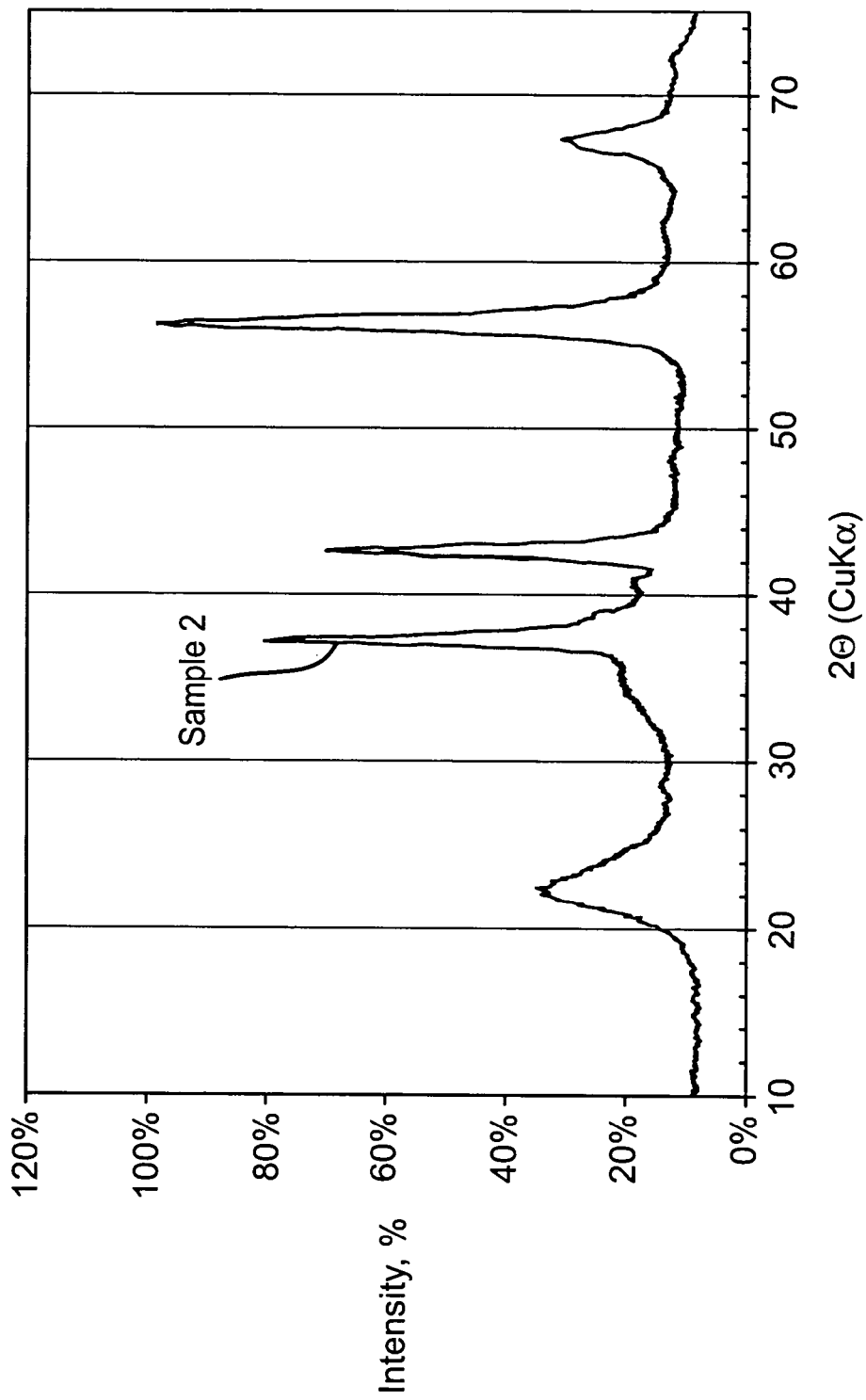
Figure 4E:
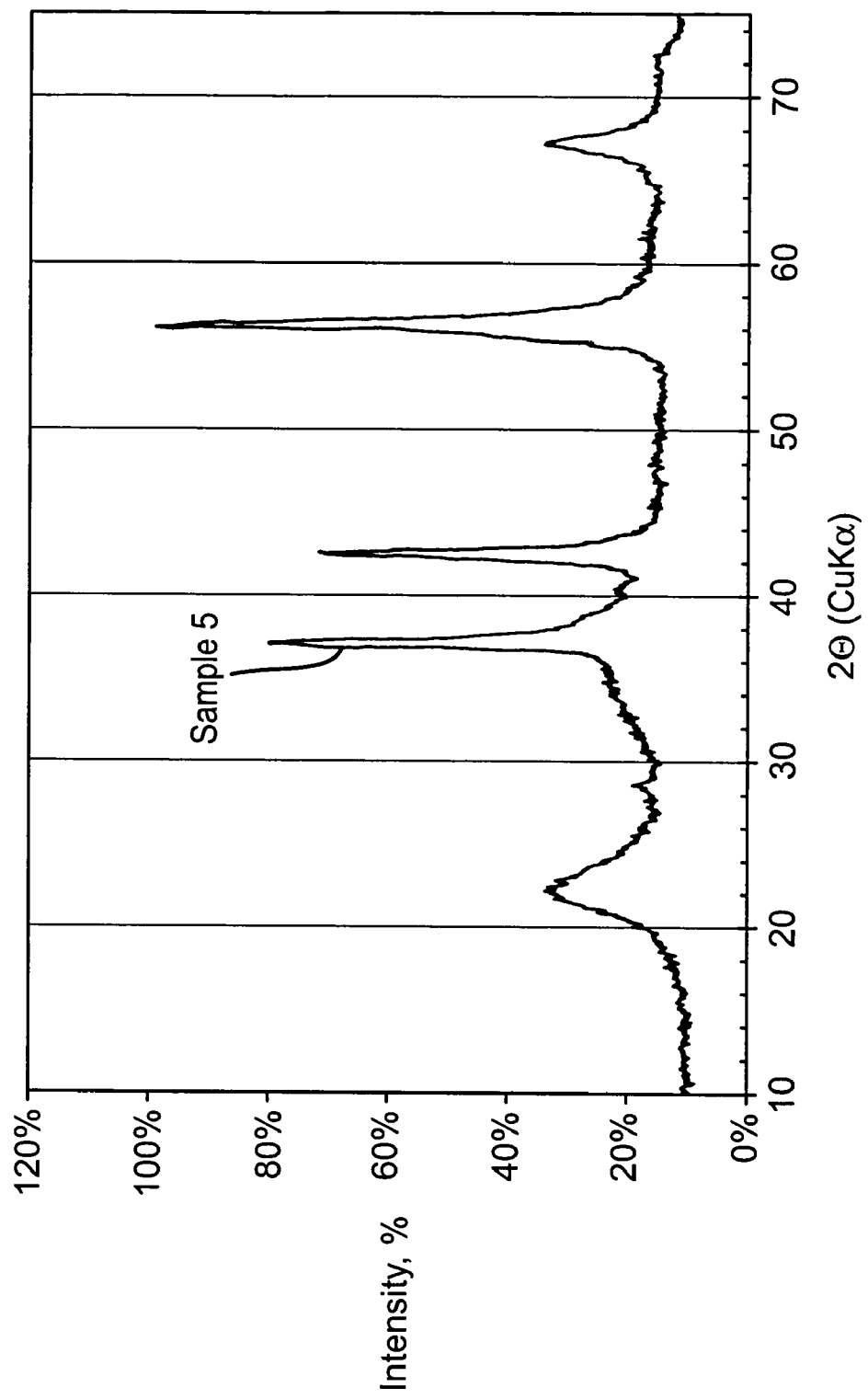
Figure 5A:
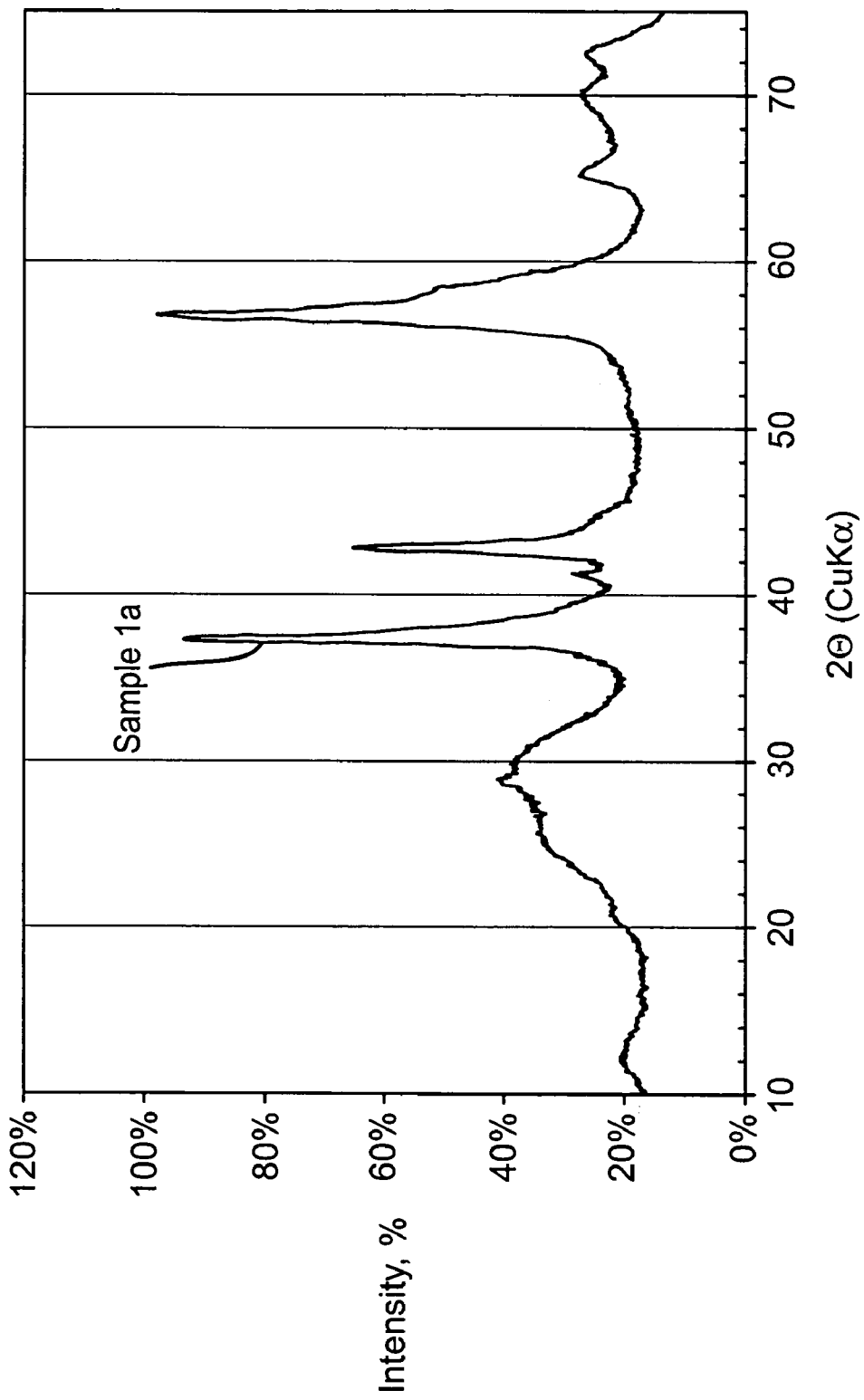
Figure 5B:
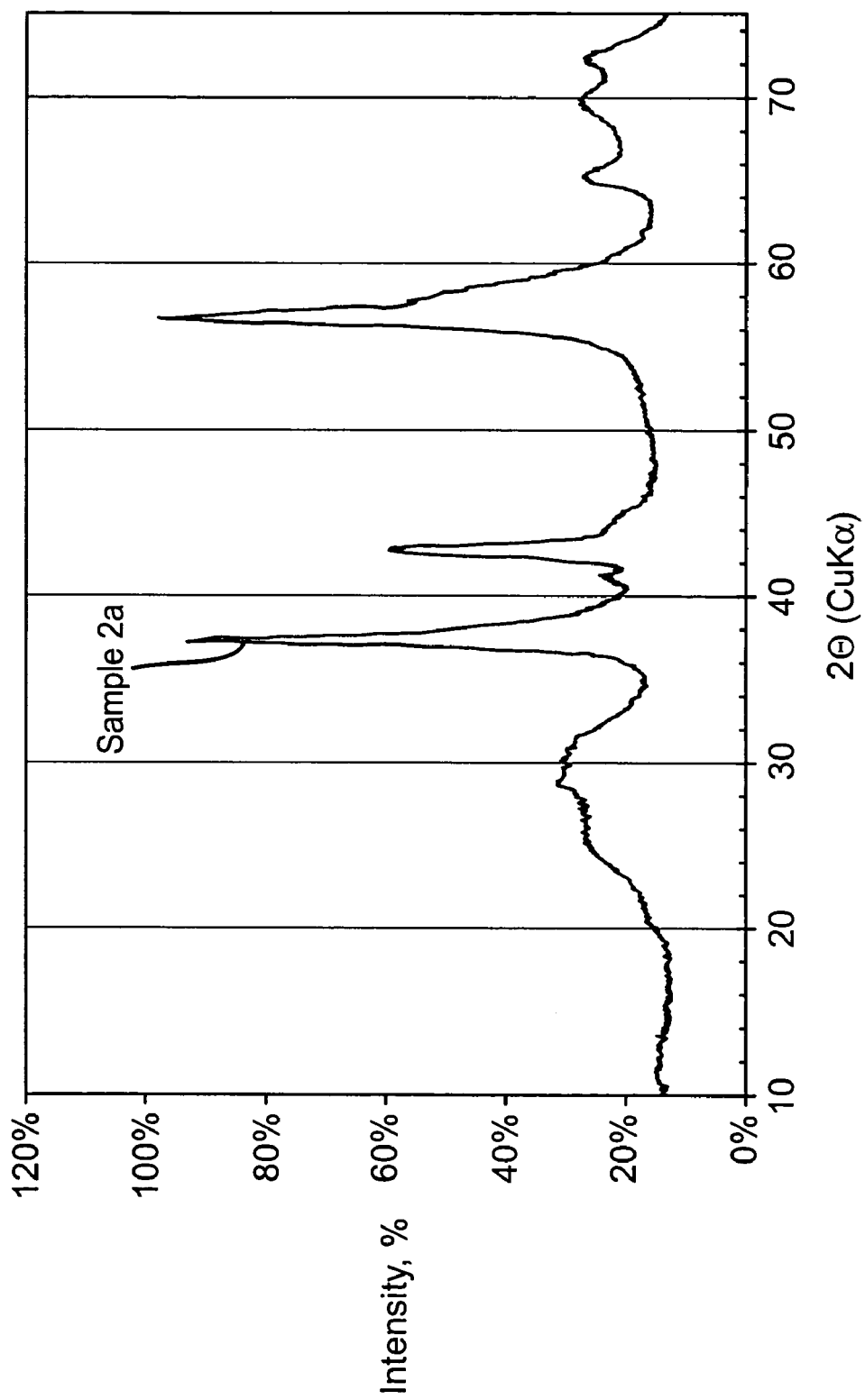
Figure 5D:
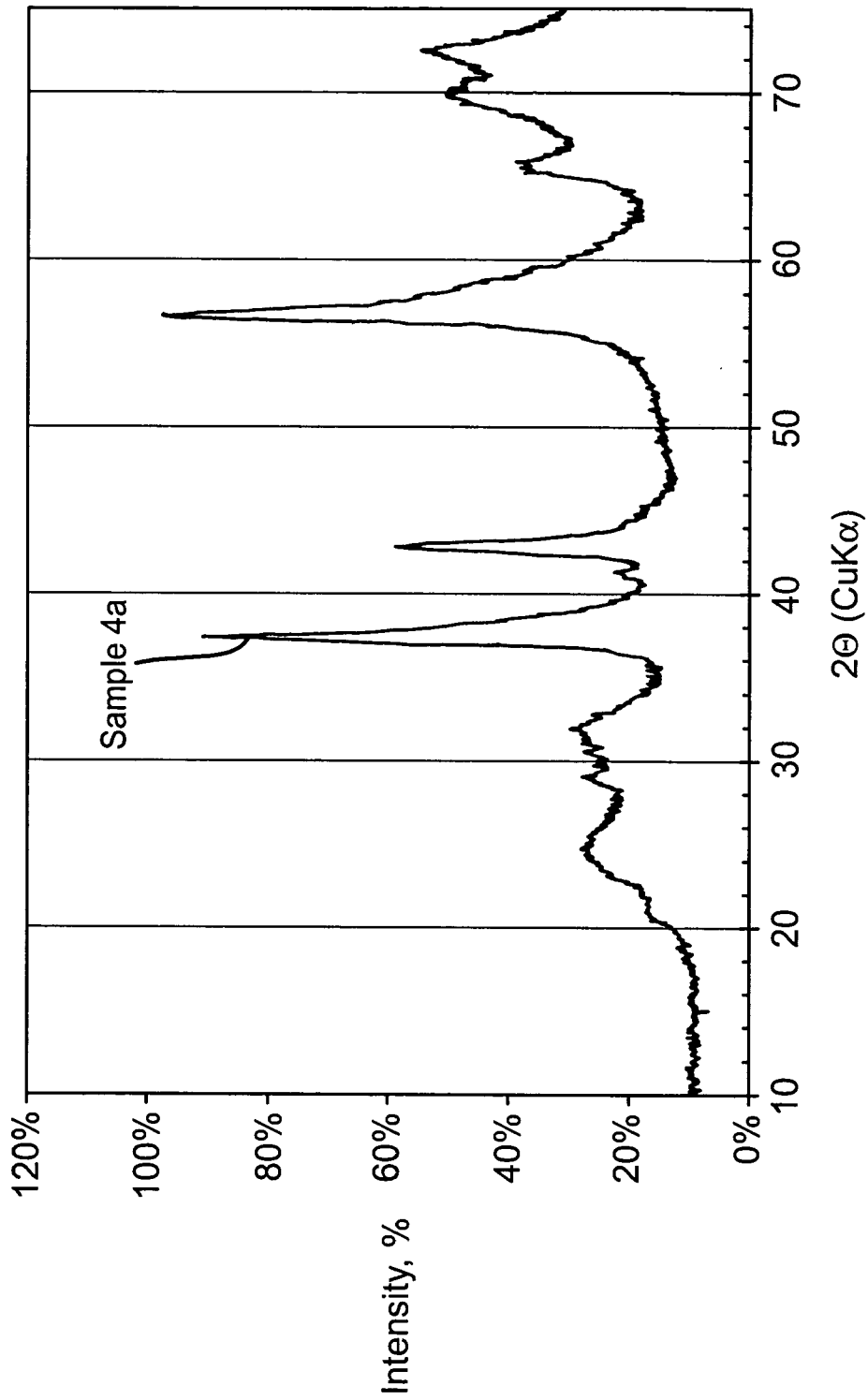
Figure 5E:
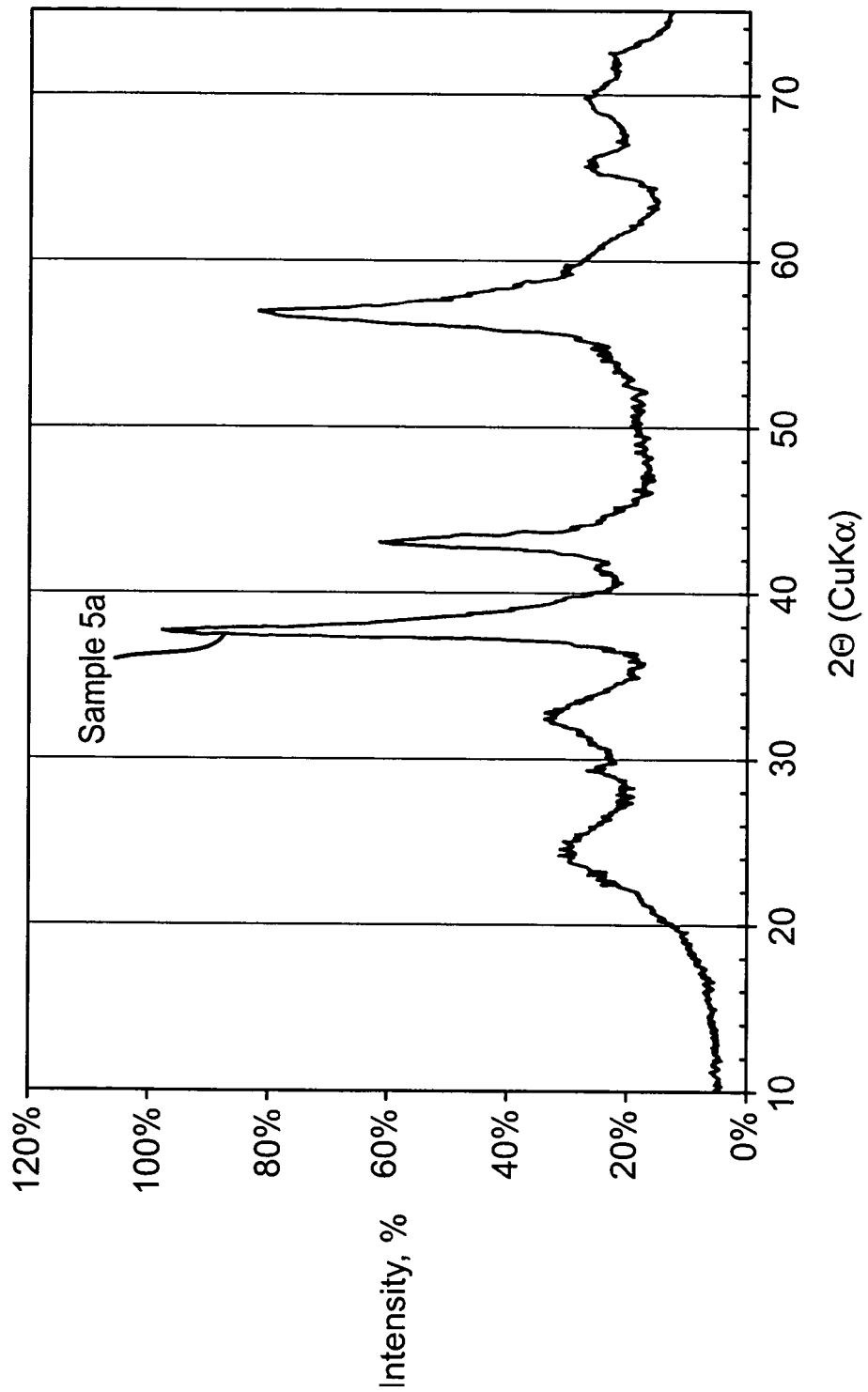
Figure 6A:
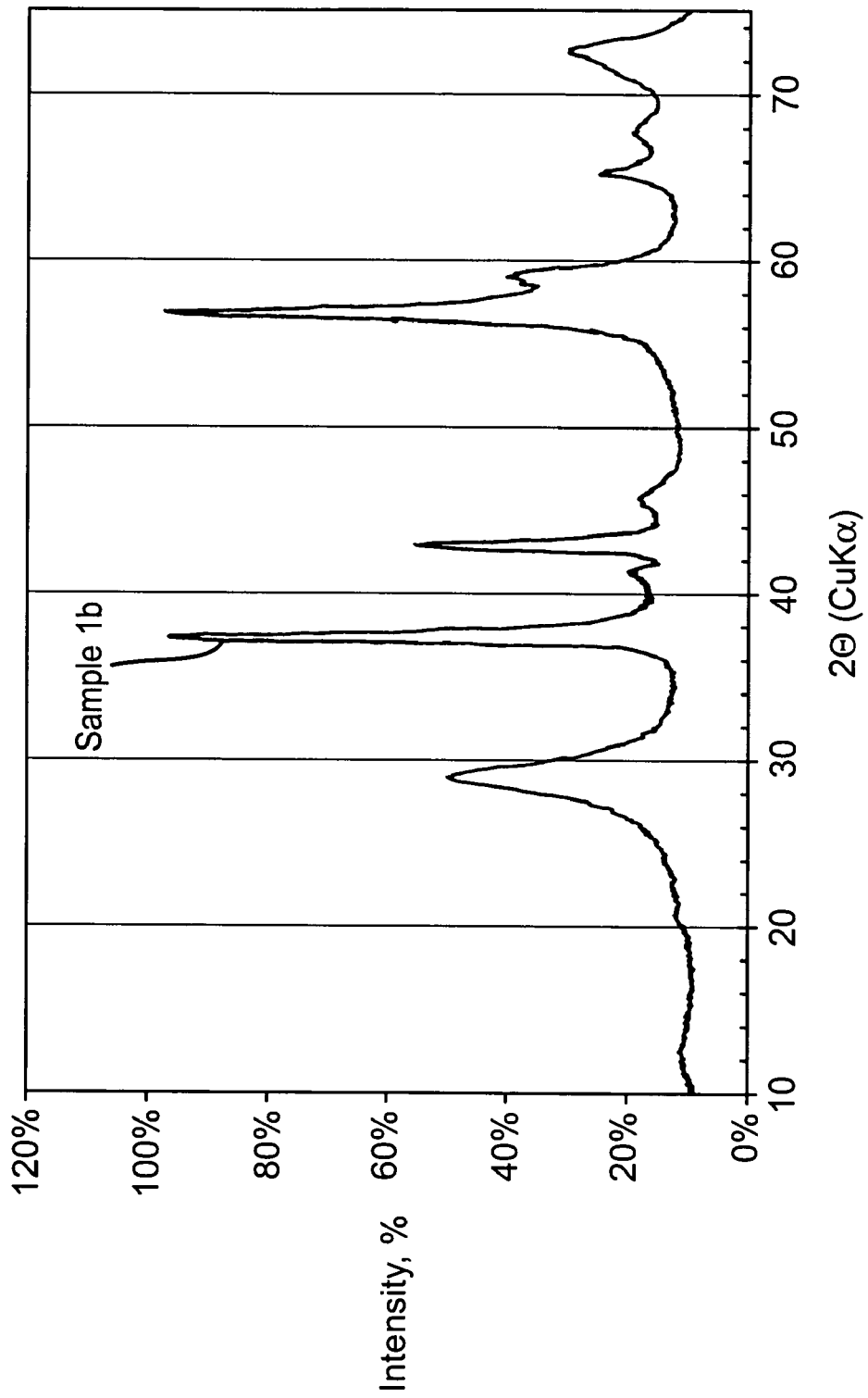
Figure 6B:
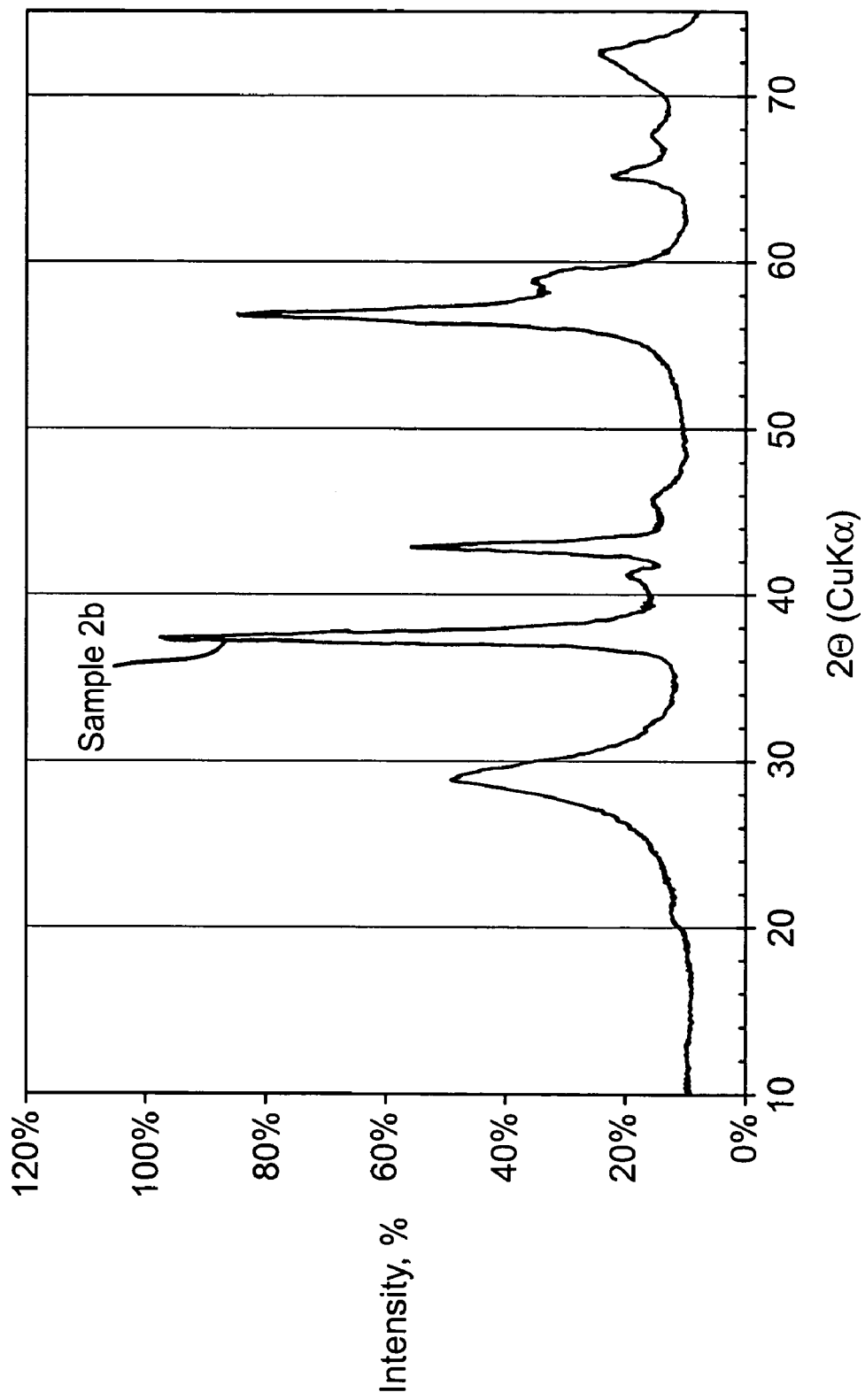
Figure 6C:
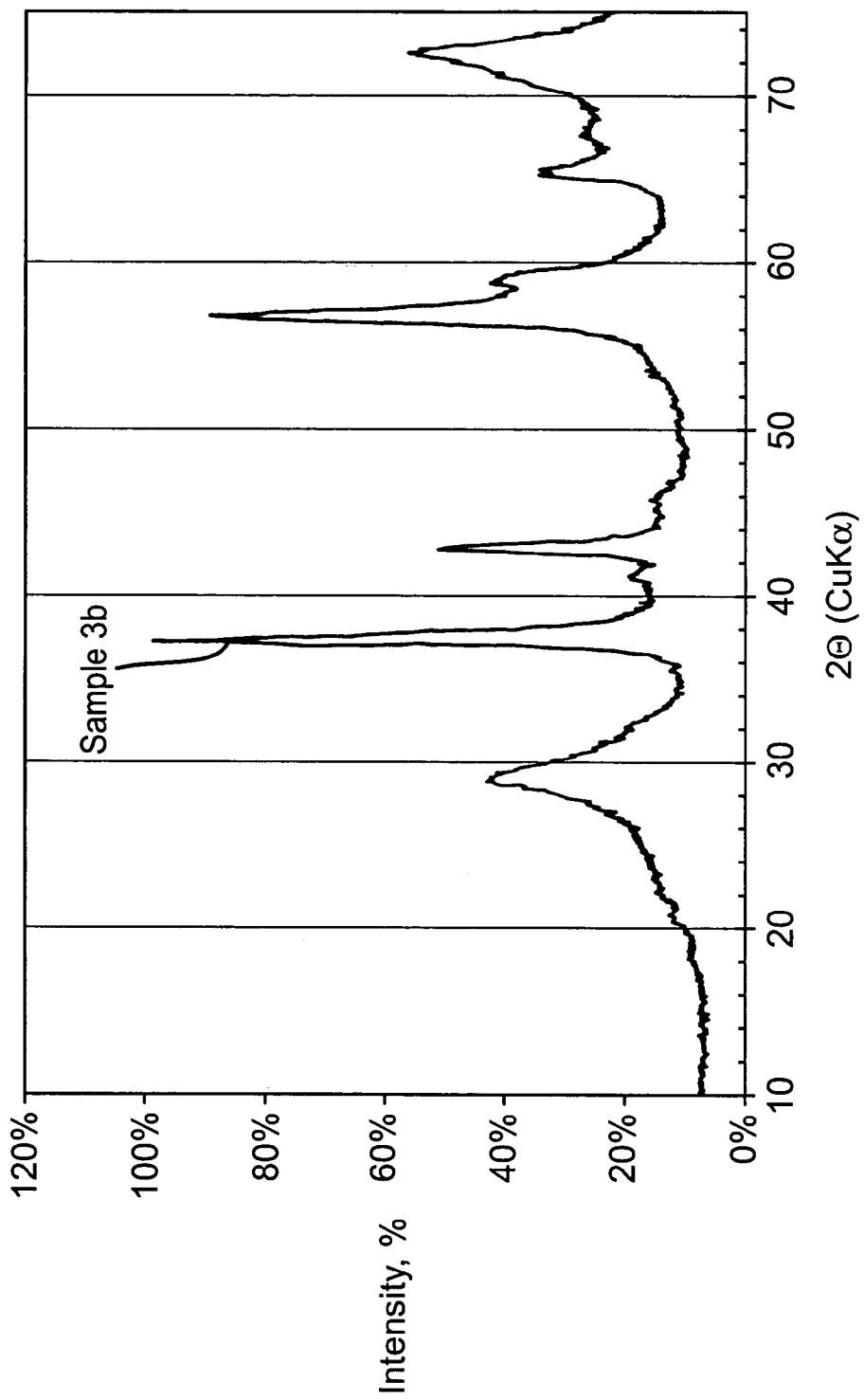
Figure 6D:
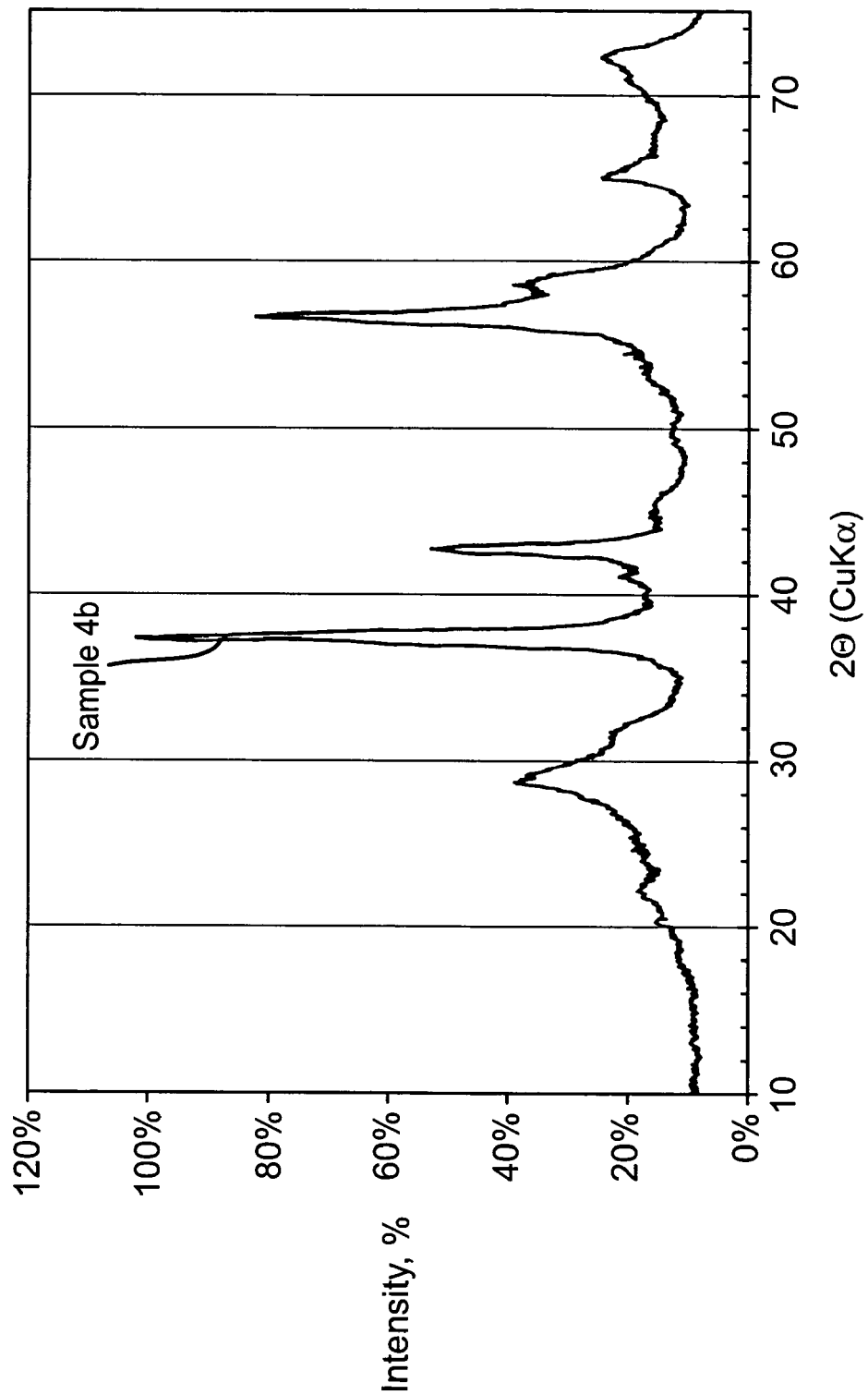

Referring now to FIG. 3, in some embodiments, the lithium manganese oxide can have a Lithium NMR spectrum that includes a peak at about 550 ppm. Without wishing to be bound by theory, it is believed that this peak is indicative of the movement of lithium cations from cation vacancy sites in the lithium manganese oxide into tunnels between ramsdellite crystal lattices of the lithiated manganese oxide.

As indicated above, the lithium manganese oxide can be further characterized as having a relatively low surface area. A cell that includes a cathode active material with a relatively low surface area may experience less gassing than a cell that includes a cathode active material with a higher surface area. In certain embodiments, the lithium manganese oxide can have a BET surface area of about 100 $m^2$/gram or less (e.g., about 80 $m^2$/gram or less, about 50 $m^2$/gram or less, about 25 $m^2$/gram or less, about 20 $m^2$/gram or less, about 15 $m^2$/gram or less, about ten $m^2$/gram or less, about five $m^2$/gram or less, about one $m^2$/gram or less), and/or about 0.4 $m^2$/gram or more (e.g., about one $m^2$/gram or more, about five $m^2$/gram or more, about ten $m^2$/gram or more, about 15 $m^2$/gram or more, about 20 $m^2$/gram or more, about 25 $m^2$/gram or more, about 50 $m^2$/gram or more, about 80 $m^2$/gram or more). For example, in some embodiments, the lithium manganese oxide can have a BET surface area of from about 11 $m^2$/gram to about 25 $m^2$/gram (e.g., about 11 $m^2$/gram).

In some embodiments, the lithium manganese oxide can have a gassing rate of less than about 60 cubic centimeters (e.g., less than about 50 cubic centimeters, less than about 40 cubic centimeters, less than about 30 cubic centimeters, less than about 20 cubic centimeters) of gas over four weeks at 60° C. Alternatively or additionally, the lithium manganese oxide can have a gassing rate of more than about 15 cubic centimeters (e.g., more than about 20 cubic centimeters, more than about 30 cubic centimeters, more than about 40 cubic centimeters, more than about 50 cubic centimeters) of $CO_2$ gas over four weeks at 60° C.

One of two different tests can be used to determine the $CO_2$ gassing rate of the lithium manganese oxide: a foil bag gas test, and an in-cell gas test. In a foil bag gas test, 1.8 grams of electrolyte and 6.5 grams of lithiated manganese oxide are sealed in an aluminized Mylar bag and stored at 60° C. The electrolyte is 0.65 M lithium trifluoromethanesulfonate (LiTFS) dissolved in a solvent that includes 20 percent by weight propylene carbonate, ten percent by weight ethylene carbonate, and 70 percent by weight dimethoxyethane. Gas evolution is then determined by displacement and weight under water. In an in-cell gas test, 1.8 grams of electrolyte and 6.5 grams of lithiated manganese oxide on an expanded stainless steel grid are added into an uncrimped ⅔ A cell. The electrolyte is 0.65 M lithium trifluoromethanesulfonate (LiTFS) dissolved in a solvent that includes 20 percent by weight propylene carbonate, ten percent by weight ethylene carbonate, and 70 percent by weight dimethoxyethane. Approximately 0.5 gram of lithium metal, and a separator including two strips of microporous polypropylene, are also added into the cell. Top and bottom insulators are added into the cell, as well. After all components have been added into the cell, a cap is placed on the cell, and the cell is pre-discharged by about six percent to about eight percent. The cell is then sealed in an aluminized Mylar bag and stored at 60° C. Gas evolution is determined by displacement and weight under water.

Alternatively or additionally, the lithium manganese oxide can be characterized as having a relatively high pore volume. In certain embodiments, the lithium manganese oxide can have a pore volume of at least 0.03 cubic centimeter per gram (e.g., at least 0.04 cubic centimeter per gram, at least 0.05 cubic centimeter per gram), and/or at most 0.06 cubic centimeter per gram (e.g., at most 0.05 cubic centimeter per gram, at most 0.04 cubic centimeter per gram).

In certain embodiments, the lithium manganese oxide can be characterized as having a relatively high average pore diameter. In some embodiments, the cathode active material can have an average pore diameter of at least about 80 Å (e.g., at least about 100 Å, at least about 150 Å, at least about 200 Å, at least about 250 Å), and/or at most about 300 Å (e.g., at most about 250 Å, at most about 200 Å, at most about 150 Å, at most about 100 Å).

In some embodiments, the lithium manganese oxide can have one or more of the above enhanced properties (e.g., a relatively high pore volume), while also having a density that is at least comparable to the density of other cathode active materials. As the density of a cathode active material increases, the amount of cell space occupied by that cathode active material decreases, such a cell including a cathode active material with a higher density can be smaller than a comparable cell including a cathode active material with a lower density. Alternatively or additionally, a cell that includes a cathode active material with a higher density may provide more space for other cell components than a comparable cell that includes a cathode active material with a lower density. In certain embodiments, the lithium manganese oxide can have a density of at least about four grams per cubic centimeter (e.g., at least about 4.1 grams per cubic centimeter, at least about 4.2 grams per cubic centimeter, at least about 4.3 grams per cubic centimeter, at least about 4.4 grams per cubic centimeter, at least about 4.5 grams per cubic centimeter, at least about 4.6 grams per cubic centimeter, at least about 4.7 grams per cubic centimeter, at least about 4.8 grams per cubic centimeter, at least about 4.9 grams per cubic centimeter), and/or at most about five grams per cubic centimeter (e.g., at most about 4.9 grams per cubic centimeter, at most about 4.8 grams per cubic centimeter, at most about 4.7 grams per cubic centimeter, at most about 4.6 grams per cubic centimeter, at most about 4.5 grams per cubic centimeter, at most about 4.4 grams per cubic centimeter, at most about 4.3 grams per cubic centimeter, at most about 4.2 grams per cubic centimeter, at most about 4.1 grams per cubic centimeter).

The lithium manganese oxide can have a relatively high capacity, such that electrochemical cell 10 can exhibit good electrical performance. In some embodiments, the lithium manganese oxide can have a capacity of about 150 mAh/gram or more (e.g., about 195 mAh/gram or more, about 215 mAh/gram or more, about 250 mAh/gram or more, about 280 mAh/gram or more, about 300 mAh/gram or more), and/or about 350 mAh/gram or less (e.g., about 300 mAh/gram or less, about 280 mAh/gram or less, about 250 mAh/gram or less, about 215 mAh/gram or less, about 195 m Ah/gram or less). In certain embodiments (e.g., in certain embodiments in which cell 10 is discharged at a relatively low current, such as about 100 ohms or less), the lithium manganese oxide can have a capacity of from about 250 mAh/gram to about 350 mAh/gram. In some embodiments (e.g., in some embodiments in which cell 10 is discharged at a relatively high current, such as about five Watts or more), the lithium manganese oxide can have a capacity of from about 150 mAh/gram to about 280 mAh/gram.

Cathode 16 includes a current collector on which the cathode active material (e.g., the lithium manganese oxide) can be coated or otherwise deposited. The current collector can have a region in contact with positive lead 18 and a second region in contact with cathode the active material. The current collector serves to conduct electricity between positive lead 18 and the cathode active material. The current collector can be made of a material that is strong and is a good electrical conductor (has a low resistivity), for example a metal such as stainless steel, titanium, aluminum, or an aluminum alloy. One form that the current collector can take is an expanded metal screen or grid, such as a non-woven expanded metal foil. Grids of stainless steel, aluminum or aluminum alloy are available from Exmet Corporation (Branford, Conn.)

In some embodiments, a cathode can be made by coating a cathode material (e.g., a lithium manganese oxide) onto a current collector, and drying and then calendering the coated current collector. The cathode material is prepared by mixing an active material together with other components such as a binder, solvent/water, and a carbon source. For example, to form the cathode material, an active material such as a lithium manganese oxide can be combined with carbon (e.g., graphite and/or acetylene black), and mixed with a small amount of water. The current collector can then be coated with the cathode slurry to form the cathode.

In a cylindrical cell, the anode and cathode can be spirally wound together, with a portion of the cathode current collector extending axially from one end of the roll. The portion of the current collector that extends from the roll can be free of cathode active material. To connect the current collector with an external contact, the exposed end of the current collector can be welded to a metal tab, which is in electric contact with an external battery contact. The grid can be rolled in the machine direction, the pulled in the machine direction, perpendicular to the machine direction, or perpendicular to the pulled direction. The tab can be welded to the grid to minimize the conductivity of grid and tab assembly. Alternatively, the exposed end of the current collector can be in mechanical contact (i.e. not welded) with a positive lead which is in electric contact with an external battery contact. A cell having a mechanical contact can require fewer parts and steps to manufacture than a cell with a welded contact. In certain embodiments, the effectiveness of the mechanical contact can be enhanced by bending the exposed grid towards the center of the roll to create a dome or crown, with the highest point of the crown over the axis of the roll, corresponding to the center of a cylindrical cell. In the crown configuration, the grid can have a denser arrangement of strands than in the non-shaped form. A crown can be orderly folded and the dimensions of a crown can be precisely controlled.

In some embodiments in which the cathode active material includes a lithium manganese oxide, the lithium manganese oxide can be formed by lithiating a manganese dioxide, and subsequently heat treating the lithiated manganese dioxide. During lithiation, lithium ions exchange with hydrogen ions in the crystal lattice of the manganese dioxide, and during heat treatment, residual and surface moisture is removed from the lithiated manganese dioxide. The manganese dioxide can be, for example, electrolytically-synthesized manganese dioxide (EMD), chemically-synthesized manganese dioxide (CMD), or a combination (e.g., a blend) of EMD and CMD. Distributors of manganese dioxides include Kerr-McGee Corp. (manufacturer of, e.g., Trona D and high-power EMD), Tosoh Corp., Delta Manganese, Delta EMD Ltd., Mitsui Chemicals, ERACHEM, and JMC. In some embodiments, the manganese dioxide that is provided can include protons that are inserted into the manganese dioxide crystal lattice (e.g., the protons can be inserted into the manganese dioxide crystal lattice when the manganese dioxide is manufactured).

The manganese dioxide can be lithiated by any of a number of different methods. As an example, the manganese dioxide can be lithiated by exposure to a lithium salt. For example, the manganese dioxide can be lithiated by exposure to a strongly basic lithium salt, such as lithium hydroxide. Other examples of lithium salts that can be used to lithiate manganese dioxide include lithium nitrate, lithium carbonate, lithium chloride, lithium bromide, lithium tetrachloroaluminate ($LiAlCl_4$), and lithium tetrachlorogallate ($LiGaCl_4$). In some embodiments, the lithium salt can be in an aqueous solution. In certain embodiments, the lithium salt (e.g., lithium hydroxide, lithium nitrate, or a mixture thereof) can be in a nonaqueous medium (e.g., sulfolane or a mixture of sulfolane and an ether). In some embodiments, the lithium salt (e.g., $LiAlCl_4$, $LiGaCl_4$) can be in molten form. In some such embodiments, the lithium salt can be in a molten medium (e.g., ethylmethylimidazolium tetrachloroaluminate). When the manganese dioxide is exposed to a lithium salt, lithium cations from the lithium salt can ion-exchange with protons in the manganese dioxide crystal lattice to form $Li_xMnO_2$, in which x is at least about 0.11 and/or at most about 0.25 (e.g., in which x is about 0.11). Because protons generally are exchanged for lithium cations during this lithiation process, the formal oxidation state of the manganese in the manganese dioxide may not change substantially as a result of lithiation. This can be beneficial because a significant decrease in the formal oxidation state of the manganese can result in the lithiated manganese dioxide having a relatively low discharge capacity. Lithiation of manganese oxide compounds is described, for example, in Iltchev et al., U.S. Pat. No. 6,190,800, which is incorporated herein by reference.

As another example, manganese dioxide (e.g., EMD) can be mechanochemically treated (e.g., by reactive milling) with lithium carbonate to lithiate the manganese dioxide. The mechanochemical lithiation of manganese dioxide is described, for example, in Christian et al., U.S. Pat. No. 6,403,257 B1, which is incorporated herein by reference.

As an additional example, manganese dioxide can be lithiated by an electrochemical process. For example, the manganese dioxide can be formed into a cathode and placed in a battery with a lithium anode and an electrolyte containing a lithium salt. The battery can then be partially discharged, which can cause the manganese dioxide to become lithiated. The lithiated manganese dioxide can then be removed from the cell and heat-treated.

The manganese dioxide can be lithiated at room temperature (25° C.), or at a higher temperature. While not wishing to be bound by theory, it is believed that an increase in the temperature of the lithiation process can increase the extent of lithiation by increasing the rate of ion-exchange between lithium cations and protons in the manganese dioxide. In some embodiments, the manganese dioxide can be lithiated at a temperature of at least about 30° C. (e.g., at least about 40° C., at least about 50° C., at least about 60° C., at least about 70° C., at least about 80° C., at least about 90° C., at least about 100° C., at least about 110° C., at least about 120° C.), and/or at most about 150° C. (e.g., at most about 140° C., at most about 130° C., at most about 120° C., at most about 110° C., at most about 100° C., at most about 90° C., at most about 80° C., at most about 70° C., at most about 60° C., at most about 50° C., at most about 40° C.). For example, the manganese dioxide can be lithiated at a temperature of about 60° C., about 70° C., about 80° C., about 90° C., or about 100° C.

After lithiation, the manganese dioxide can include up to about two percent by weight lithium. In certain embodiments, the manganese dioxide can include at least about 0.8 percent by weight (e.g., at least about 0.85 percent by weight, at least about 0.9 percent by weight, at least about 0.95 percent by weight, at least about one percent by weight, at least about 1.05 percent by weight, at least about 1.1 percent by weight, at least about 1.15 percent by weight, at least about 1.2 percent by weight, at least about 1.25 percent by weight), and/or at most about 1.3 percent by weight (e.g., at most about 1.25 percent by weight, at most about 1.2 percent by weight, at most about 1.15 percent by weight, at most about 1.1 percent by weight, at most about 1.05 percent by weight, at most about one percent by weight, at most about 0.95 percent by weight, at most about 0.9 percent by weight, at most about 0.85 percent by weight) lithium. For example, the manganese dioxide can include about 0.85 percent by weight lithium, about 0.95 percent by weight lithium, or about 1.2 percent by weight lithium. In some embodiments, the manganese dioxide can include 1.19 percent by weight lithium.

In some embodiments, after the lithiation process, the lithiated manganese dioxide is heated in an atmosphere including oxygen (e.g., an atmosphere including greater than about 21 percent oxygen) to form the cathode active material. The lithiated manganese oxide can be heated using, for example, a box furnace (e.g., a Model #: HTF55347C three-zone tube furnace, from Lindberg/Blue M, Asheville, N.C.) or a rotary kiln. In some embodiments, the lithiated manganese oxide can be heated using agitation (e.g., in conjunction with a furnace). In embodiments in which the lithiated manganese oxide is heated using both a furnace and agitation, the agitation can shorten reaction time by contacting the lithiated manganese oxide with the walls of the furnace, and can enhance moisture removal from the lithiated manganese oxide by increasing the exposure of the lithiated manganese oxide to air and/or oxygen. The heat treatment of the lithiated manganese oxide can remove moisture (e.g., surface moisture) from the lithiated manganese dioxide, which can result in reduced gassing by the lithiated manganese dioxide. Without wishing to be bound by theory, it is believed that the oxygen in the atmosphere can help to prevent oxygen loss from the lithiated manganese dioxide as it is heated, and can help to limit the formation of $Mn_2O_3$, which is advantageous because as the amount of $Mn_2O_3$ that is present in the lithiated manganese oxide increases the electrochemical performance of the cell can decrease. In some embodiments, the lithiated manganese dioxide can be heated in an atmosphere including greater than about 40 percent oxygen (e.g., greater than about 50 percent oxygen, greater than about 60 percent oxygen, greater than about 70 percent oxygen, greater than about 80 percent oxygen, greater than about 90 percent oxygen). Alternatively or additionally, the lithiated manganese dioxide can be heated in an atmosphere including less than about 100 percent oxygen (e.g., less than about 90 percent oxygen, less than about 80 percent oxygen, less than about 70 percent oxygen, less than about 60 percent oxygen, less than about 50 percent oxygen, less than about 40 percent oxygen). For example, the lithiated manganese dioxide can be heated in an atmosphere including from about 60 percent to about 100 percent oxygen (e.g., about 85 percent oxygen). In certain embodiments, the lithiated manganese dioxide can be heated in an atmosphere including about 100 percent oxygen.

During heat treatment, the lithiated manganese dioxide can be heated to, for example, a temperature of about 300° C. or greater (e.g., about 325° C. or greater, about 350° C. or greater, about 375° C. or greater, about 400° C. or greater, about 420° C. or greater, about 425° C. or greater, about 450°

C. or greater, about 475° C. or greater), and/or about 500° C. or less (e.g., about 475° C. or less, about 450° C. or less, about 425° C. or less, about 420° C. or less, about 400° C. or less, about 375° C. or less, about 350° C. or less, about 325° C. or less). For example, the lithiated manganese dioxide can be heated to a temperature of from about 300° C. to about 500° C. (e.g., from about 400° C. to about 500° C., from about 420° C. to about 500° C., from about 440° C. to about 490° C., from about 445° C. to about 455° C.). In certain embodiments, the lithiated manganese dioxide can be heated to a temperature of about 350° C., about 400° C., about 450° C., or about 480° C.

In some embodiments, the lithiated manganese dioxide can be heated in an oxygen atmosphere for at most about 48 hours (e.g., at most about 36 hours, at most about 24 hours, at most about 12 hours, at most about six hours, at most about two hours, at most about one hour, at most about 30 minutes, at most about 15 minutes, at most about ten minutes, at most about five minutes) and/or at least about one minute (e.g., at least about five minutes, at least about ten minutes, at least about 15 minutes, at least about 30 minutes, at least about one hour, at least about two hours, at least about six hours, at least about 12 hours, at least about 24 hours, at least about 36 hours). In certain embodiments, the lithiated manganese dioxide can be heated in an oxygen atmosphere for a period of from about one hour to about 12 hours (e.g., from about one hour to about six hours, from about one hour to about three hours). In some instances, the lithiated manganese dioxide can be heated in an oxygen atmosphere for about one hour.

Anode 12 can include an anode active material, usually in the form of an alkali metal (e.g., lithium, sodium, potassium) or an alkaline earth metal (e.g., calcium, magnesium). The anode can include an alloy of an alkali metal (e.g., lithium) and an alkaline earth metal or an alloy of an alkali metal and aluminum. For example, anode 12 can include a lithium-aluminum alloy. Alternatively or additionally, anode 12 can include a lithium-insertion compound, such as $LiC_6$, $Li_4Ti_5O_{12}$, or $LiTiS_2$. The anode can be used with or without a substrate. In some embodiments, the anode can include an anode active material and a binder. In such embodiments, the anode active material can include a tin-based material, a carbon-based material (e.g., carbon, graphite, an acetylenic mesophase carbon, coke), a metal oxide, and/or a lithiated metal oxide. The binder can be, for example, polyethylene, polypropylene, a styrene-butadiene rubber, or polyvinylidene fluoride (PVDF). The anode active material and binder can be mixed to form a paste which can be applied to the substrate of anode 12. Specific anode active materials that are used in a cell may be a function of, for example, the type of cell (such as primary or secondary).

The electrolytic solution or electrolyte can be in liquid, solid or gel (polymer) form. The electrolyte can contain an organic solvent such as propylene carbonate (PC), ethylene carbonate (EC), dimethoxyethane (DME) (e.g., 1,2-dimethoxyethane), butylene carbonate (BC), dioxolane (DX), tetrahydrofuran (THF), gamma-butyrolactone, diethyl carbonate (DEC), dimethyl carbonate (DMC), ethyl methyl carbonate (EMC), dimethylsulfoxide (DMSO), methyl formiate (MF), sulfolane, or a combination (e.g., a mixture) thereof. The electrolyte can alternatively contain an inorganic solvent such as $SO_2$ or $SOCl_2$. The electrolyte also can contain one or more salts (e.g., two salts, three salts, four salts). Examples of salts include lithium salts, such as lithium trifluoromethanesulfonate (LiTFS), lithium trifluoromethanesulfonimide (LiTFSI), lithium hexafluorophosphate ($LiPF_6$), and combinations thereof. Additional lithium salts that can be included are listed in Suzuki, U.S. Pat. No. 5,595,841, which is incorporated herein by reference in its entirety. Other salts that can be included in the electrolyte are bis(oxalato)borate salts. Bis(oxalato)borate salts are described, for example, in U.S. Ser. No. 10/800,905, filed on Mar. 15, 2004, and entitled "Non-Aqueous Electrochemical Cells", which is incorporated herein by reference in its entirety.

Positive lead 18 can include stainless steel, aluminum, an aluminum alloy, nickel, titanium, or steel. Positive lead 18 can be annular in shape, and can be arranged coaxially with the cylinder of a cylindrical cell. Positive lead 18 can also include radial extensions in the direction of cathode 16 that can engage the current collector. An extension can be round (e.g. circular or oval), rectangular, triangular or another shape. Positive lead 18 can include extensions having different shapes. Positive lead 18 and the current collector are in electrical contact. Electrical contact between positive lead 18 and the current collector can be achieved by mechanical contact. Alternatively, positive lead 18 and the current collector can be welded together.

Separator 20 can be formed of any of the standard separator materials used in electrochemical cells. For example, separator 20 can be formed of polypropylene (e.g., nonwoven polypropylene or microporous polypropylene), polyethylene, a polysulfone, or combinations thereof.

Case 22 can be made of, for example, a metal (e.g., aluminum, an aluminum alloy, nickel, nickel plated steel, stainless steel) and/or a plastic (e.g., polyvinyl chloride, polypropylene, polysulfone, ABS or a polyamide).

Cap 24 can be made of, for example, aluminum, nickel, titanium, or steel.

Electrochemical cell 10 can have a relatively high discharge voltage. In certain embodiments, electrochemical cell 10 can have a discharge voltage of at least about 1.5 Volts (e.g., at least about 1.8 Volts, at least about two Volts, at least about 2.2 Volts, at least about 2.3 Volts, at least about 2.4 Volts, at least about three Volts, at least about 3.4 Volts, at least about 3.6 Volts, at least about 3.7 Volts), and/or at most about 3.8 Volts (e.g., at most about 3.7 Volts, at most about 3.6 Volts, at most about 3.4 Volts, at most about three Volts, at most about 2.4 Volts, at most about 2.3 Volts, at most about 2.2 Volts, at most about two Volts, at most about 1.8 Volts).

Electrochemical cell 10 can have a relatively high open-circuit voltage and/or closed-circuit voltage. In certain embodiments, electrochemical cell 10 can have an open-circuit voltage and/or a closed-circuit voltage of at least about 1.5 Volts (e.g., at least about 2.8 Volts, at least about three Volts, at least about 3.2 Volts, at least about 3.3 Volts, at least about 3.4 Volts, at least about 3.5 Volts, at least about 3.6 Volts, at least about 3.7 Volts), and/or at most about 3.8 Volts (e.g., at most about 3.7 Volts, at most about 3.6 Volts, at most about 3.5 Volts, at most about 3.4 Volts, at most about 3.3 Volts, at most about 3.2 Volts, at most about three Volts, at most about 2.8 Volts). The open circuit voltage of a battery can be measured by, for example, a high impedance Voltmeter, with an input impedance of greater than ten MegOhms, so that there is virtually no load on the battery during the test. The closed circuit voltage of a battery can be measured by, for example, applying a six-ampere constant current load to the battery for 0.1 seconds and measuring the voltage of the battery.

In some embodiments, electrochemical cell 10 can have a current capability of up to about 20 amperes (e.g., up to about 16 amperes, up to about 15 amperes).

While electrochemical cell 10 in FIG. 1 is a primary cell, in some embodiments a secondary cell can have a cathode that includes the above-described cathode active material. Primary electrochemical cells are meant to be discharged (e.g., to exhaustion) only once, and then discarded. Primary cells are not intended to be recharged. Primary cells are described, for example, in David Linden, *Handbook of Batteries* (McGraw-Hill, 2d ed. 1995). Secondary electrochemical cells can be recharged for many times (e.g., more than fifty times, more than a hundred times, or more). In some cases, secondary cells can include relatively robust separators, such as those having many layers and/or that are relatively thick. Secondary cells can also be designed to accommodate for changes, such as swelling, that can occur in the cells. Secondary cells are described, for example, in Falk & Salkind, "Alkaline Storage Batteries", John Wiley & Sons, Inc. 1969; DeVirloy et al., U.S. Pat. No. 345,124; and French Patent No. 164,681, all incorporated herein by reference.

To assemble the cell, separator 20 can be cut into pieces of a similar size as anode 12 and cathode 16 and placed therebetween, as shown in FIG. 1. Anode 12, cathode 16, and separator 20 are then placed within case 22, which is then filled with the electrolytic solution and sealed. One end of case 22 is closed with cap 24 and annular insulating gasket 26, which can provide a gas-tight and fluid-tight seal. Positive lead 18 connects cathode 16 to cap 24. Safety valve 28 is disposed in the inner side of cap 24 and is configured to decrease the pressure within electrochemical cell 10 when the pressure exceeds some predetermined value. Additional methods for assembling the cell are described in Moses, U.S. Pat. No. 4,279,972; Moses et al., U.S. Pat. No. 4,401,735; and Kearney et al., U.S. Pat. No. 4,526,846, all of which are incorporated herein by reference.

Other configurations of electrochemical cell 10 can also be used, including, for example, the button or coin cell configuration, the prismatic cell configuration, the rigid laminar cell configuration, and the flexible pouch, envelope or bag cell configuration. Furthermore, the electrochemical cells can be of different voltages (e.g., 1.5 V, 3.0 V, or 4.0 V). Electrochemical cells are described, for example, in U.S. Ser. No. 10/675,512, filed on Sep. 30, 2003, and entitled "Batteries"; U.S. Ser. No. 10/719,025, filed on Nov. 24, 2003, and entitled "Battery Including Aluminum Component"; and U.S. Ser. No. 10/800,905, filed on Mar. 15, 2004, and entitled "Non-Aqueous Electrochemical Cells", all of which are incorporated herein by reference.

The following examples are meant to be illustrative and not limiting.

EXAMPLES

Example 1

Manganese oxide cathode active materials were prepared according to the following procedure.
Preparation of Lithiated Manganese Dioxide at 25° C.:

Five samples of lithiated manganese dioxide, each at a different pH, were each prepared according to the following procedure. Target pH values for the samples included pH 9 (sample 1), pH 10 (sample 2), pH 11 (sample 3), pH 12 (sample 4), and pH 13 (sample 5).

Six-hundred grams of EMD (Delta EMD lithium grade $MnO_2$) were placed in a two-liter beaker and dispersed with about one liter of water.

Solid $LiOH.H_2O$ (from Fisher) was added to the beaker with continual stirring, while the pH of the contents of the beaker was monitored.

When the desired target pH (noted above) was reached, the slurry of $MnO_2$ in LiOH solution was put aside and allowed to stand overnight (for about 16 hours) at about 25° C.

After the slurry had been allowed to stand overnight, the pH of the slurry typically was within about 0.1 pH unit of the target pH. Additional solid $LiOH.H_2O$ was then added to the slurry to adjust the pH of the slurry to the target pH.

After the target pH was reached, the slurry was filtered through a fine porosity glass fritted filter to isolate the lithiated manganese dioxide (to make kilograms of the lithiated manganese dioxide, a pressure filter can be used).

The wet manganese dioxide was then dried overnight (for about 16 hours) under vacuum at 110° C. to provide a dark brown powder.

The quantity of $LiOH.H_2O$ used for each sample, as well as the actual pH and the nominal composition of each sample, are provided in Table 1 below:

TABLE 1

| Sample No. | Target pH | Grams $LiOH.H_2O$ | Actual pH | $x$ in $Li(x)MnO_2$ |
|---|---|---|---|---|
| 1 | 9 | 7.29 | 8.85 | 0.025 |
| 2 | 10 | 11.03 | 10.9 | 0.038 |
| 3 | 11 | 15.97 | 10.71 | 0.055 |
| 4 | 12 | 22.84 | 11.97 | 0.079 |
| 5 | 13 | 32.19 | 12.93 | 0.111 |

FIGS. 4a-4e show X-ray diffraction patterns (using CuKα radiation) for samples 1-5, respectively. As shown in FIGS. 4a-4e, the X-ray diffraction patterns for all five samples include a broad [110] peak at about 23 degrees, a small pyrolusite 28-degree peak, and a single peak near 68 degrees.
Heat Treatment of Lithiated Manganese Dioxide in Air at 350° C.:

The above-formed lithiated manganese dioxide samples were then heated according to the following procedure.

Approximately 300 grams of each sample in Table 1 were heated in air at 350° C. for seven hours, using the heat treatment procedure described in Iltchev et al., U.S. Pat. No. 6,190,800, to form five samples (samples 1a-5a) of heat-treated lithiated manganese oxides. Sample 1a was formed from sample 1 of Table 1, sample 2a was formed from sample 2 of Table 1, sample 3a was formed from sample 3 of Table 1, sample 4a was formed from sample 4 of Table 1, and sample 5a was formed from sample 5 of Table 1.

X-ray diffraction patterns (using CuKα radiation) of the resulting heat-treated compounds (samples 1a-5a) are shown in FIGS. 5a-5e. As FIGS. 5a-5e show, heating the lithiated manganese oxide samples (samples 1-5 of Table 1) to 350° C. changed the X-ray diffraction patterns of all five of the samples. In all five of the heat-treated samples (samples 1a-5a), the single peak near 68 degrees has been replaced by a pattern of three peaks at about 65 degrees, 69 degrees, and 73 degrees. While the small pyrolusite 28-degree peak remains present in all five samples, the [110] peak at 23 degrees has changed substantially. For example, samples 1a and 2a (i.e., the samples at pH 9 and pH 10, respectively) do not have any [110] peak at 23 degrees, indicating conversion of any ramsdellite-pyrolusite (gamma-$MnO_2$) in the samples into pyrolusite. Samples 3a and 4a (i.e., the samples at pH 11 and pH 12, respectively), which had a higher lithium content than samples 1a and 2a, each have a broad peak near 24 degrees and a broad peak near 32 degrees. Sample 5a (the sample at pH 13) has well-resolved peaks at 24 degrees and 33 degrees, which are believed to be characteristic of the lithiated manganese dioxide composition produced by the methods described in U.S. Pat. No. 6,190,800.
Heat Treatment of Lithiated Manganese Dioxide in an Oxygen Atmosphere at 450° C.:

The remaining amounts of the five samples in Table 1 were heated in an atmosphere including more than about 21 percent oxygen at about 450° C. for 24 hours. The samples (about 300 grams of each sample) were heated in a Series 3210 three-zone tube furnace (from Applied Test Systems, Inc.), which had a 24-inch heating zone and a 3-inch diameter tube, and which used a Series 2010 three-zone furnace control system (from Applied Test Systems, Inc.). A tank of zero-grade oxygen (Airgas, Radnor, Pa.) was used to provide oxygen flow through the furnace as the samples were heated. The oxygen flow rate was over 100 cubic centimeters per minute.

The heat treatment in an oxygen atmosphere produced five samples (samples 1b-5b) of heat-treated lithiated manganese oxides. Sample 1b was formed from sample 1 of Table 1, sample 2b was formed from sample 2 of Table 1, sample 3b was formed from sample 3 of Table 1, sample 4b was formed from sample 4 of Table 1, and sample 5b was formed from sample 5 of Table 1.

FIGS. 6a-6e show X-ray diffraction patterns of samples 1b-5b, respectively. As shown in FIGS. 6a-6e, all five samples no longer have a peak near 68 degrees, but have a new peak near 58 degrees. Furthermore, all of the samples now have a much larger pyrolusite 28-degree peak. In addition, samples 4b and 5b (the samples at pH 12 and pH 13, respectively) now have peaks near 22 degrees and 32 degrees, as well as a peak near 54 degrees. These peaks at 22 degrees, 32 degrees, and 54 degrees are indicative of the presence of a new manganese oxide composition.

Figure 7:
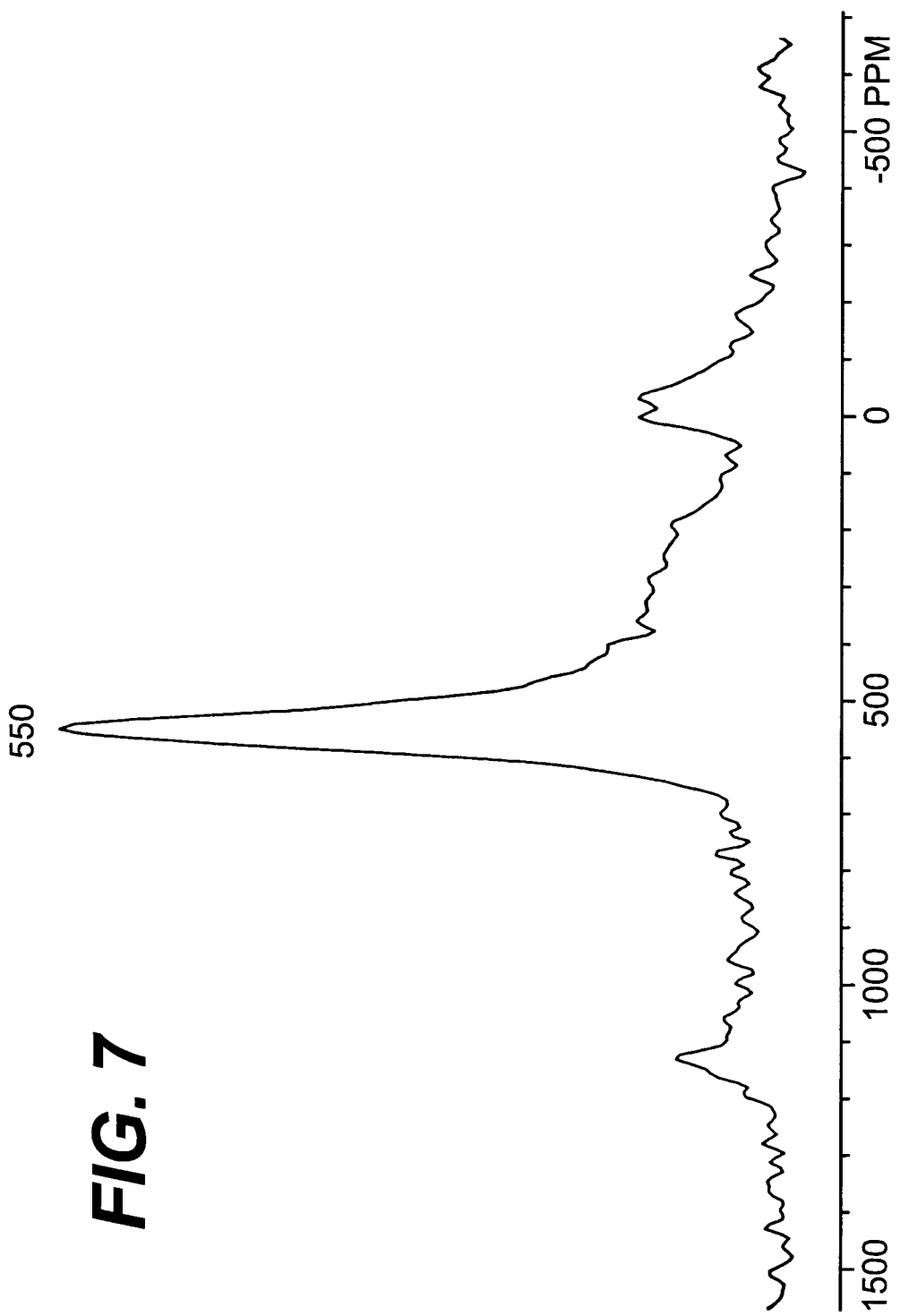
FIG. 7 shows a Lithium NMR spectrum of the lithiated manganese oxide sample of FIG. 6e.

FIG. 7 shows a Lithium NMR spectrum of the sample 5b manganese oxide composition. As FIG. 7 shows, sample 5b has a Lithium NMR peak at about 550 ppm.

The weight percent of the manganese in the manganese oxide compositions produced by both heat treatment processes described above, as well as the value of "x" in $MnO_x$ for the manganese oxide compositions, were then determined, as shown in Table 2 below. A control sample of β-EMD (from KMG) also was tested. The weight percent of the manganese was determined using plasma emission spectroscopy, and the value of "x" in $MnO_x$ was determined by a ferrous sulfate titration.

TABLE 2

| Sample Number | Total Percent Manganese | x in $MnO_x$ |
|---|---|---|
| β-EMD (Control) | 61.6 | 1.97 |
| Sample 1a | 61.6 | 1.97 |
| Sample 1b | 62.1 | 1.97 |
| Sample 2a | 61.6 | 1.96 |
| Sample 2b | 62.0 | 1.96 |
| Sample 3a | 61.2 | 1.96 |
| Sample 3b | 61.8 | 1.96 |
| Sample 4a | 60.9 | 1.95 |
| Sample 4b | 62.1 | 1.95 |
| Sample 5a | 60.8 | 1.94 |
| Sample 5b | 61.4 | 1.94 |

As shown, the lithiated EMD samples that were heated in air (samples 1a-5a) were not substantially different from the lithiated EMD samples that were heated in an oxygen atmosphere (samples 1b-5b), in terms of total percent manganese and the value of x in $MnO_x$.

Next, the lithium content, density, and BET surface area of samples 1a-5a and 1b-5b were measured, and are reproduced in Table 3 below:

TABLE 3

| Sample Number | Percent Lithium | Density (g/cc) | Surface Area (m²/gram) |
|---|---|---|---|
| β-EMD (Control) | 0.064 | 4.772 | 30.8 |
| Sample 1a | 0.27 | 4.620 | 31.5 |
| Sample 1b | 0.28 | 4.437 | 17.8 |
| Sample 2a | 0.38 | 4.610 | 32.3 |

TABLE 3-continued

| Sample Number | Percent Lithium | Density (g/cc) | Surface Area (m²/gram) |
|---|---|---|---|
| Sample 2b | 0.37 | 4.815 | 18.9 |
| Sample 3a | 0.54 | 4.572 | 25.0 |
| Sample 3b | 0.54 | 4.685 | 19.1 |
| Sample 4a | 0.62 | 4.569 | 28.2 |
| Sample 4b | 0.65 | 4.663 | 22.4 |
| Sample 5a | 0.86 | 4.507 | 30.2 |
| Sample 5b | 0.85 | 4.575 | 23.00 |

As shown in Table 3, each of the lithiated EMD samples that were heated in an oxygen atmosphere (i.e., samples 1b-5b) had a much lower BET surface area than the corresponding lithiated EMD samples that were heated in air (i.e., samples 1a-5a).

Foil-bag gas tests were then conducted on samples 1a-5a and 1b-5b. The results of these foil-bag gas tests are reproduced in Table 4 below. For each of the foil-bag gas tests, 1.8 grams of electrolyte (0.65M LiTFS dissolved in ten percent EC, 20 percent PC, and 70 percent DME), and 6.5 grams of a cathode active material sample were added into an aluminized Mylar bag. The bag was then sealed and stored at 60° C. for differing lengths of time. Gas evolution was determined by displacement and weight under water.

TABLE 4

| Sample Number | BET Surface Area (m²/g) | One Day (cc/cell) | 1 Week (cc/cell) | 2 Weeks (cc/cell) | 3 Weeks (cc/cell) | 4 Weeks (cc/cell) |
|---|---|---|---|---|---|---|
| β-EMD (Control) | 30.8 | 20.69 | 34.73 | 39.67 | 42.32 | 44.22 |
| Sample 1a | 31.5 | 21.92 | 37.54 | 43.0 | 46.26 | 48.44 |
| Sample 1b | 17.8 | 10.29 | 18.51 | 21.43 | 22.91 | 23.99 |
| Sample 2a | 32.3 | 18.82 | 34.32 | 39.78 | 43.1 | 45.45 |
| Sample 2b | 18.9 | 10.64 | 19.99 | 23.46 | 25.26 | 26.54 |
| Sample 3a | 25.0 | 16.85 | 32.76 | 38.4 | 41.87 | 44.46 |
| Sample 3b | 19.1 | 10.92 | 21.08 | 25.04 | 27.32 | 28.92 |
| Sample 4a | 28.2 | 18.43 | 35.39 | 41.76 | 45.71 | 48.54 |
| Sample 4b | 22.4 | 11.16 | 21.74 | 25.98 | 28.58 | 30.31 |
| Sample 5a | 30.2 | 16.01 | 33.15 | 39.94 | 44.45 | 47.75 |
| Sample 5b | 23.0 | 11.21 | 22.2 | 26.88 | 29.76 | 31.90 |

As Table 4 shows, the samples that were heat-treated in an oxygen atmosphere (i.e., samples 1b-5b), which had relatively low BET surface areas, also had relatively low gassing. The samples that were heat-treated in an air atmosphere (samples 1a-5a) had comparatively higher BET surface areas and gassing.

Figure 8:
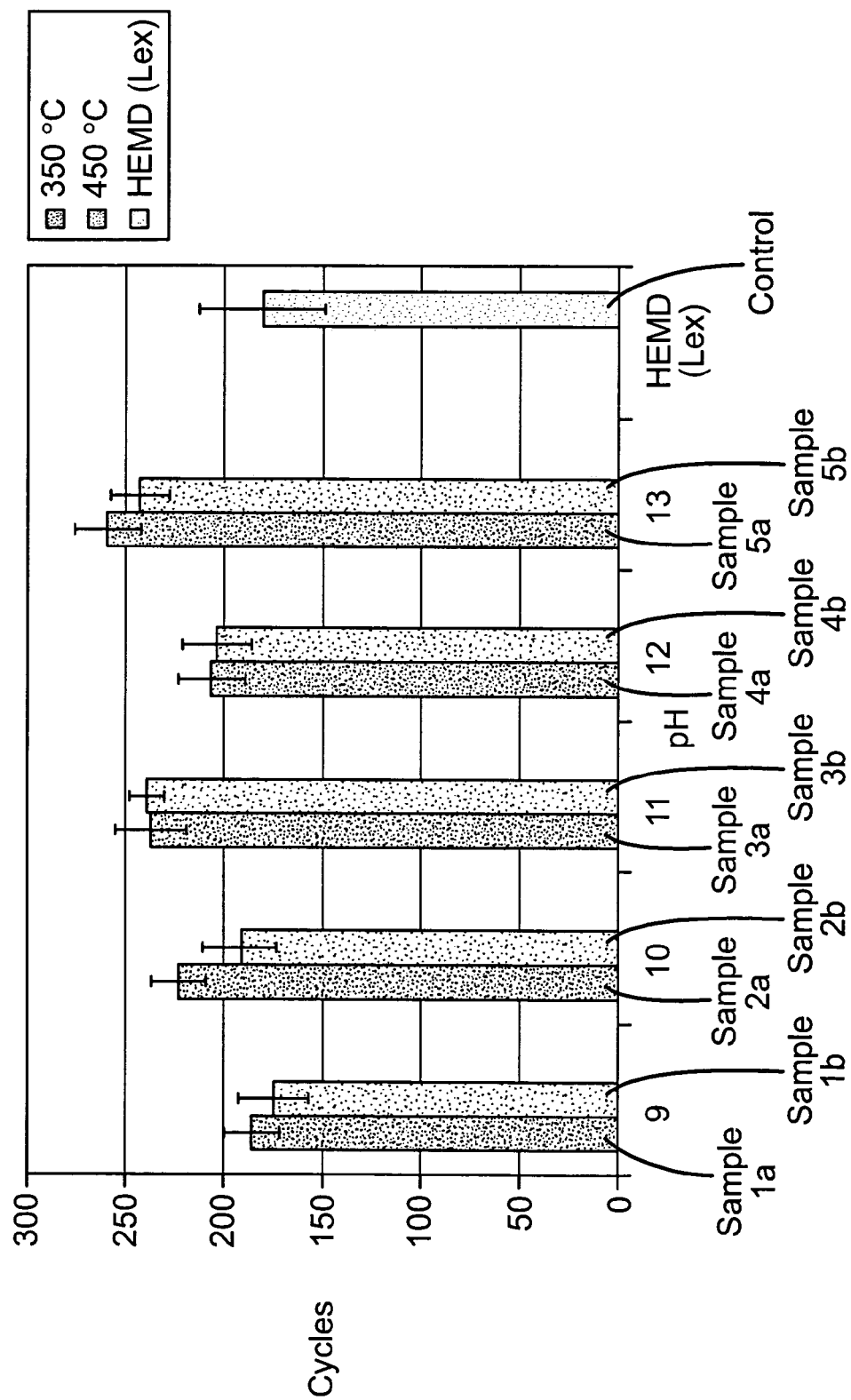
FIG. 8 shows a graph of the electrical performance of the heated lithiated manganese oxide samples of FIGS. 5a-5e and 6a-6e.

Referring now to FIG. 8, the results of a "digital camera" test at room temperature are shown for test cells that included one of samples 1a-5a or samples 1b-5b. The digital camera test was performed using a Maccor 2300 series benchtop battery test system, available from Maccor. The digital camera test simulated the working conditions of a digital camera by subjecting the test cells to a number of pulses, under a constant five-Watt power load. During the digital camera test, ten 2430-size coin cells, each filled with 0.3 gram of one of samples 1a-5a or samples 1b-5b, were tested. The cells also included an electrolyte (a mixture of EC, PC, and DME). For comparison, one 2430-size coin cell filled with 0.3 gram of β-EMD (from Delta) was used as a control cell. The results of the digital camera test for samples 1a-5a and samples 1b-5b in fresh cells (cells that had not been discharged prior to the test) are shown in FIG. 8. (Each pulse to which a cell responded was considered to be a cycle.)

Table 5, below, shows the test protocol for the digital camera test. Each 2430-size coin cell was first subjected to a "Flash On-LCD On" portion of the test, which included a series of pulses, and was then subjected to a "Flash Off-LCD On" portion of the test, which also included a series of pulses. Each pulse (listed as a "step" in the table) was designed to mimic a function of the camera, and to provide the corresponding draw from the battery. For example, step 1 corresponded to the draw required by the LCD of a camera, step 2 corresponded to the zoom feature of a camera, steps 3, 5, 7, and 9 corresponded to the process function of a camera (which drives the microprocessor of the camera), step 4 corresponded to the autofocus feature of a camera, step 6 corresponded to the shutter function of a camera, step 8 corresponded to the flash recharging function of a camera, step 10 corresponded to the LCD standby function of a camera (in which the camera display is on, although the camera is on standby), and step 11 corresponded to the rest function of a camera (in which there is no load on the battery). Table 5 also shows the time (in seconds) for each step, as well as the load (in Watts) of each step on the 2430-size coin cells, and what the corresponding load (in Watts) of each step would have been on a 2/3 A cell.

The pH was then adjusted to a target pH of 12.5 with the addition of more solid lithium hydroxide.

Next, the slurry was filtered through a pressure filter to isolate the lithium-exchanged manganese dioxide.

The wet manganese dioxide was then dried overnight at 100° C. to provide a dark brown powder.

Analysis of the resulting composition showed that it had a relatively high lithium content of about 1.1 percent lithium, indicating that an increase in the temperature at which lithiation takes place may increase the overall extent of lithiation.

Heat Treatment of Lithiated Manganese Dioxide in an Oxygen Atmosphere at 450° C.:

The lithiated EMD was then heated at 450° C. for one hour in an atmosphere including more than about 21 percent oxygen. The heat treatment protocol was the same as the protocol used for the Example 1 heat treatment at 450° C. under an oxygen atmosphere. The result was a manganese oxide cathode active material (sample 6).

Figure 9A:
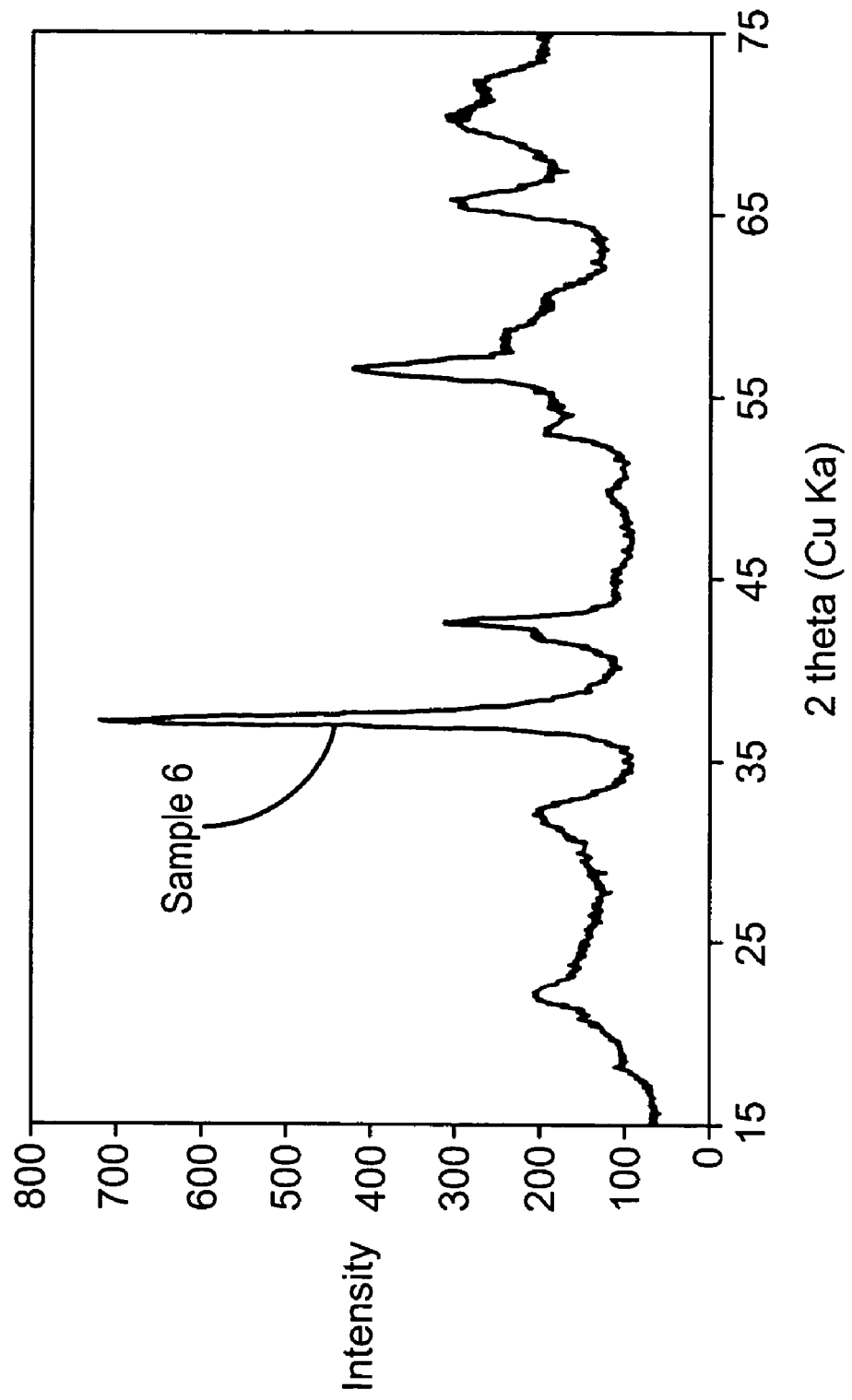

FIG. 9a shows the X-ray diffraction pattern of the sample 6 cathode active material, and FIG. 9b shows the X-ray diffraction pattern of the sample 5b cathode active material. As shown in FIG. 9a, material lithiated at 60° C. (sample 6) does not have a pyrolusite 28-degree peak. However, like samples

TABLE 5

| | | FLASH ON - LCD ON | | | FLASH OFF - LCD OFF | | |
|---|---|---|---|---|---|---|---|
| Function | Step | Load (W) 2/3 A Cell | Load (W) Sample | Time (s) | Step | Load (W) 2/3 A Cell | Load (W) Sample | Time (s) |
| LCD | 1 | 2.9 | 0.0829 | 0.5 | 1 | 2.9 | 0.0829 | 0.5 |
| Zoom | 2 | 4.87 | 0.1391 | 0.5 | 2 | 4.87 | 0.1391 | 0.5 |
| Process | 3 | 2.9 | 0.0829 | 1 | 3 | 2.9 | 0.0829 | 2 |
| Autofocus | 4 | 4.87 | 0.1391 | 0.5 | 4 | 4.87 | 0.1391 | 0.5 |
| Process | 5 | 2.9 | 0.0829 | 1 | 5 | 2.9 | 0.0829 | 1 |
| Shutter | 6 | 6 | 0.1714 | 0.1 | 6 | 6 | 0.1714 | 0.1 |
| Process | 7 | 2.9 | 0.0829 | 1 | 7 | 3 | 0.0857 | 2.4 |
| Flash Recharge | 8 | 5 | 0.1429 | 1 | | | | |
| Process | 9 | 3 | 0.0857 | 0.4 | | | | |
| LCD Standby | 10 | 2.9 | 0.0829 | 14 | 10 | 2.9 | 0.0829 | 13 |
| Rest | 11 | 0 | 0 | 40 | 11 | 0 | 0 | 40 |

Example 2

A manganese oxide cathode active material (sample 6) was prepared according to the following procedure.

Preparation of Lithiated Manganese Dioxide at 60° C.:

First, manganese dioxide was lithiated according to the following procedure.

Six-hundred grams of EMD (Kerr-McGee EMD high-power grade $MnO_2$) were placed in a two-liter beaker and dispersed with about one liter of 1M $H_2SO_4$, stirred vigorously to create a suspension, and then allowed to settle over about two hours.

The $H_2SO_4$ solution was decanted and replaced by a second one-liter amount of 1M $H_2SO_4$. The resulting solution was again stirred vigorously to create a suspension, and allowed to settle over about two hours.

The second amount of $H_2SO_4$ was also decanted, and the residual liquid was removed by filtration.

The $MnO_2$ was dispersed in one liter of distilled water and heated to 60° C.

Solid $LiOH.H_2O$ was added with continual stirring while the pH of the solution was monitored. When a stable pH of about 12.5 was reached, the slurry of $MnO_2$ in LiOH solution was put aside and allowed to stand overnight (for about 16 hours) at 60° C.

4b and 5b above, sample 6 has peaks associated with a new manganese oxide composition (such as the peaks at 18 degrees and 22 degrees).

Example 3

Two manganese oxide cathode active materials (samples 7 and 8) were formed according to the following procedure.

Figure 10:
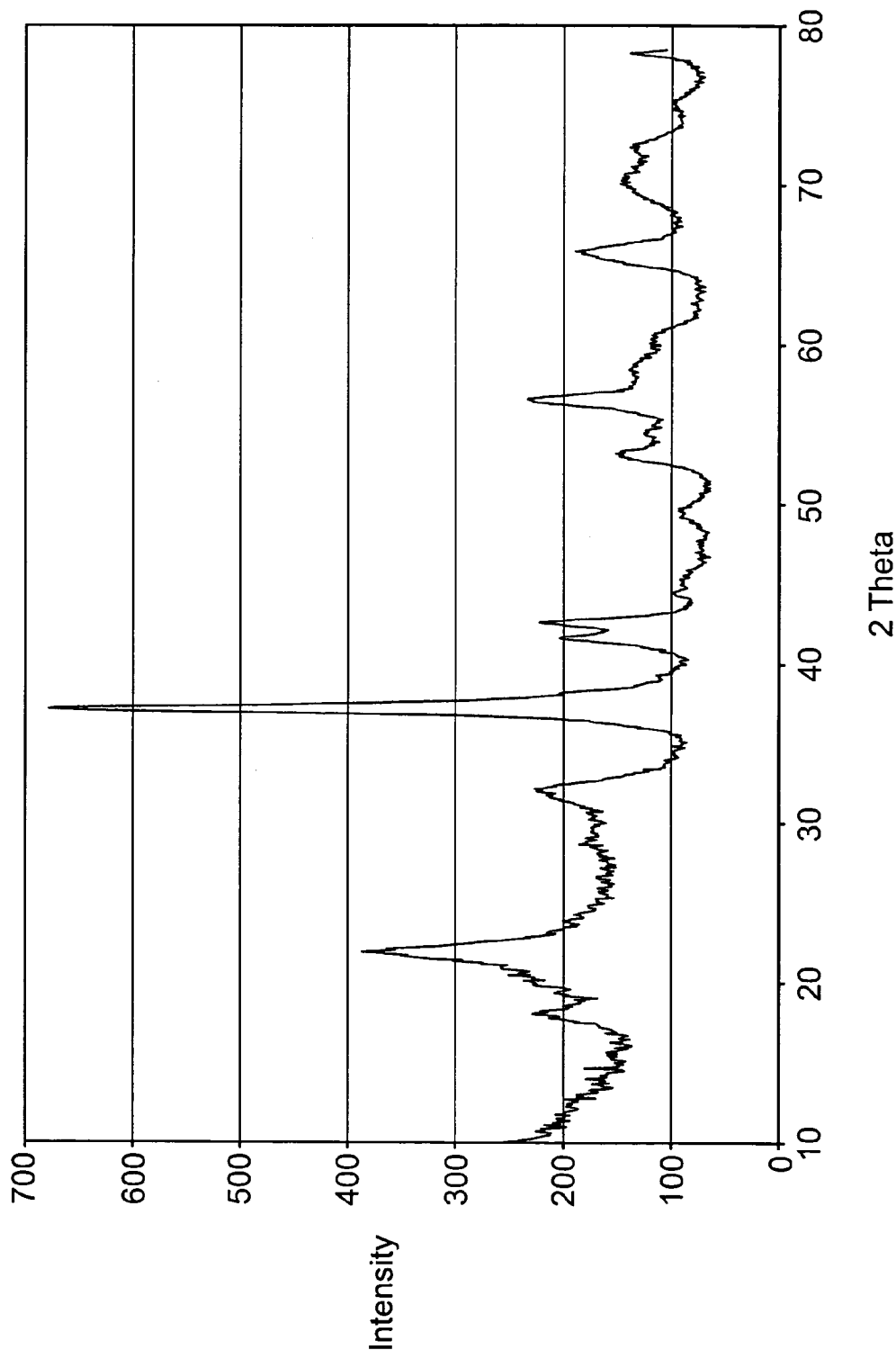
FIG. 10 shows an X-ray diffraction pattern of a lithiated manganese oxide sample that has been heated at about 450° C. in an oxygen atmosphere.
Figure 11:
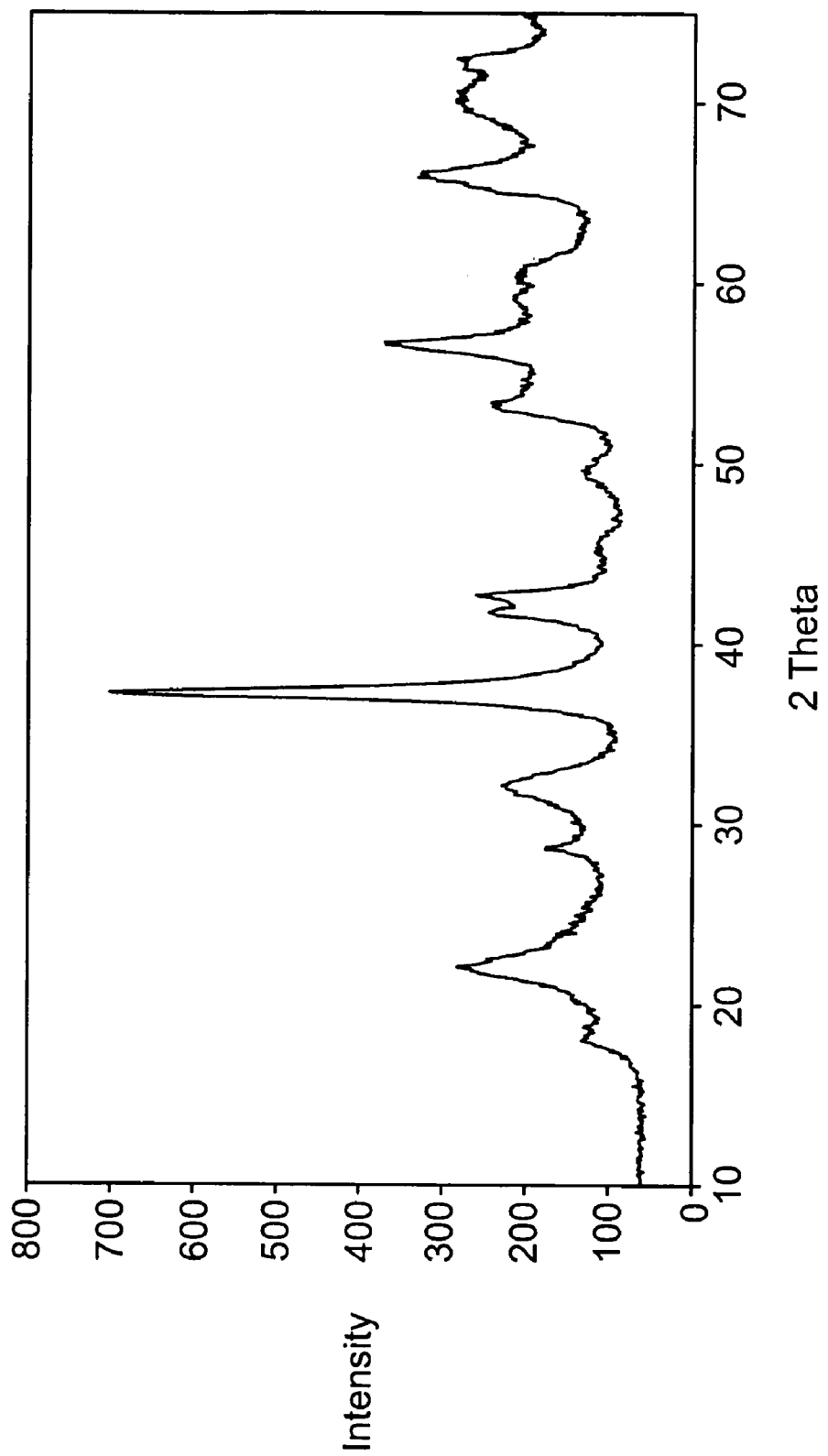
FIG. 11 shows an X-ray diffraction pattern of a lithiated manganese oxide sample that has been heated at about 450° C. in an oxygen atmosphere.

Preparation of Lithiated Manganese Dioxide at 80° C.:

Two types of manganese dioxide were lithiated at 80° C. One type of manganese dioxide, Kerr-McGee EMD high-power grade $MnO_2$, was used to prepare the sample 7 cathode active material, while another type of manganese dioxide, Delta Lithium-Grade EMD, was used to prepare sample 8 cathode active material. Each type of EMD was lithiated and then heat treated according to the process described with reference to Example 2 (with the exception that the lithiation took place at 80° C., rather than 60° C.). FIG. 10 shows the X-ray diffraction pattern for sample 7, and FIG. 11 shows the X-ray diffraction pattern for sample 8. As shown in FIG. 10, sample 7 has X-ray diffraction peaks at about 18 degrees, 22 degrees, 32 degrees, 37 degrees, 41.6 degrees, 42.6 degrees, and 54 degrees. Additionally, sample 7 contains little to no pyrolusite, as shown by the absence of a pyrolusite 28-degree peak.

The lithium content, density, and BET surface area of the sample 7 cathode active material were measured, and are shown in Table 6 below:

TABLE 6

| Sample Number | Percent Lithium | Density (g/cc) | Surface Area ($m^2$/gram) |
|---|---|---|---|
| β-EMD (Control) | 0.064 | 4.772 | 30.8 |
| Sample 7 | 1.25 | 4.589 | 12.57 |

As Table 6 shows, the sample 7 cathode active material has a comparatively low surface area.

Foil-bag gas tests were conducted on samples 7 and 8. The results of the foil-bag gas tests for sample 7 are shown in Table 7, and the results of the foil-bag gas tests for sample 8 are shown in Table 8:

TABLE 7

| Sample Number | BET Surface Area ($m^2$/g) | One Day (cc/cell) | 1 Week (cc/cell) | 2 Weeks (cc/cell) | 3 Weeks (cc/cell) | 4 Weeks (cc/cell) |
|---|---|---|---|---|---|---|
| β-EMD (Control) | 30.8 | 24.24 | 34.80 | 39.52 | 42.70 | 44.52 |
| Sample 7 | 13.12 | 6.47 | 10.67 | 13.23 | 14.76 | 16.27 |

TABLE 8

| Sample Number | BET Surface Area ($m^2$/g) | One Day (cc/cell) | 1 Week (cc/cell) | 2 Weeks (cc/cell) | 3 Weeks (cc/cell) | 4 Weeks (cc/cell) |
|---|---|---|---|---|---|---|
| β-EMD (Control) | 30.8 | 20.74 | 32.59 | 37.34 | 40.12 | 42.32 |
| Sample 8 | 22.0 | 11.02 | 21.68 | 27.55 | 30.98 | 33.73 |

As Tables 7 and 8 show, both sample 7 and sample 8 have comparatively low gassing rates.

Figure 12:
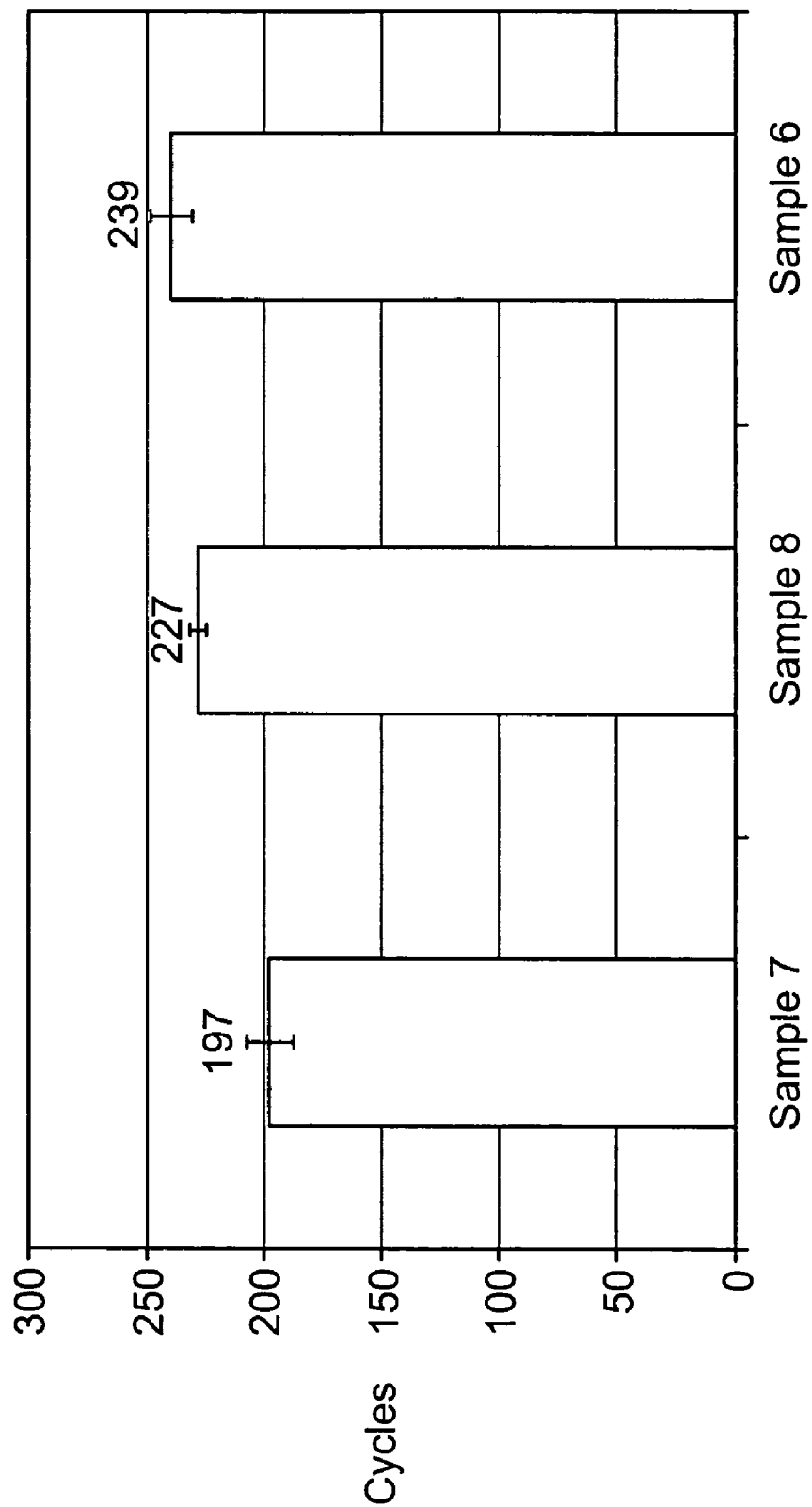
FIG. 12 shows a graph of the electrical performance of the heated lithiated manganese oxide sample of FIG. 9a, and of the heated lithium manganese oxide samples of FIGS. 10 and 11.

Finally, the sample 6, 7, and 8 cathode active materials were subjected to a digital camera test (described above). FIG. 12 shows the results of this digital camera test.

Other Embodiments

While certain embodiments have been described, other embodiments are possible.

As an example, while the lithiation of manganese dioxide has been described, in some embodiments, other manganese oxide compounds can be lithiated. The resulting lithiated manganese oxide composition can then be heated to form a cathode active material. Examples of other manganese oxide compounds that can be lithiated and heated as described above include chemically prepared manganese dioxide (e.g., Faradiser 200 or Faradiser M, from ERACHEM), and artificial ramsdellite materials, such as the persulphate prepared manganese dioxide (p-CMD) described, for example, in Wang et al., U.S. Pat. No. 5,277,890; Wang et al., U.S. Pat. No. 5,348,726; and Wang et al., U.S. Pat. No. 5,482,796, all of which are incorporated herein by reference.

As another example, while the heat treatment of lithiated manganese dioxide compounds has been described, in some embodiments, other manganese oxide compounds can be heated to provide a cathode active material. In certain embodiments, a lithium manganese oxide composition with a spinel-type structure can be formed and then delithiated, and the delithiated material can then be heat-treated in an oxygen atmosphere as described above, to produce a cathode active material. For example, $Li_4Mn_5O_{12}$ or $Li_2Mn_4O_9$ can be prepared by a solid state reaction between stoichiometric amounts of $Li_2CO_3$ and $MnCO_3$ at 400° C. for 24 hours in an air or oxygen atmosphere. The resulting material can then be delithiated at room temperature (25° C.) using an acid (e.g., 3M $HNO_3$), for 24 hours, to form $Li_xMn_4O_{9-y}$, a cathode active material, in which $0.05 \leq x \leq 0.07$.

As an additional example, while manganese oxide compositions with X-ray diffraction patterns having peaks of certain intensities have been described, in some embodiments, a manganese oxide composition can have an X-ray diffraction pattern with one or more peaks of other intensities. In some embodiments, a manganese oxide composition can have an X-ray diffraction pattern with a peak at about 18 degrees (13 percent), and/or a peak at about 22 degrees (21 percent). In certain embodiments, a manganese oxide composition can have an X-ray diffraction pattern with a peak at about 28 degrees (32 percent) and/or a peak at about 32 degrees (25 percent). Alternatively or additionally, a manganese oxide composition can have an X-ray diffraction pattern with a peak at about 37 degrees (100 percent), and/or a peak at about 57 degrees (70 percent). In some embodiments, the X-ray diffraction pattern can include a peak at about 18 degrees (13 percent), a peak at about 22 degrees (21 percent), and a peak at about 32 degrees (25 percent).

All references, such as patent applications, publications, and patents, referred to herein are incorporated by reference in their entirety.

Other embodiments are in the claims.

What is claimed is:

1. A battery comprising a cathode comprising a composition comprising a manganese oxide, wherein the composition has an X-ray diffraction pattern including a first peak at about 54 degrees, a second peak at about 22 degrees, a third peak at about 32 degrees, and a fourth peak at about 37 degrees; wherein
   the fourth peak is the largest peak, the second peak is larger than the third and first peak, and the third peak is larger than the first peak, and
   the composition has the formula $Li_xMnO_y$, and $0.05 \leq x \leq 0.25$ and $1.8 \leq y \leq 2.0$.

2. The battery of claim 1, wherein the composition has the formula $Li_xMnO_y$, and $0.05 \leq x \leq 0.25$ and $1.823 \leq y \leq 2.0$ prior to discharge of the battery.

3. The battery of claim 1, wherein $0.1 \leq x \leq 0.25$.

4. The battery of claim 1, wherein $0.15 \leq x \leq 0.25$.

5. The battery of claim 1, wherein $1.9 \leq y \leq 2.0$.

6. The battery of claim 1, wherein $1.85 \leq y \leq 1.95$.

7. The battery of claim 1, wherein the composition has a BET surface area of about 25 $m^2$/gram or less.

8. The battery of claim 1, wherein the composition has a BET surface area of from about 11 $m^2$/gram to about 25 $m^2$/gram.

9. The battery of claim 1, wherein the composition has a BET surface area of about 11 $m^2$/gram.

10. The battery of claim 1, wherein the manganese oxide is substantially free of pyrolusite.

11. The battery of claim 1, wherein the manganese oxide comprises ramsdellite.

12. The battery of claim 1, wherein the X-ray diffraction pattern of the composition further includes a fifth peak at about 41.6 degrees and a sixth peak at about 42.6 degrees.

13. The battery of claim 1, wherein the manganese oxide comprises manganese with a formal oxidation state of from about +3.0 to about +4.0.

14. The battery of claim 1, wherein the manganese oxide comprises manganese with a formal oxidation state of about +3.9.

15. The battery of claim 1, wherein the cathode has a capacity of at least about 150 mAh/gram.

16. The battery of claim 1, wherein the cathode has a capacity of from about 250 mAh/gram to about 350 mAh/gram.

17. The battery of claim 1, wherein the battery has an open-circuit voltage of at least about 1.5 Volts.

18. The battery of claim 1, wherein the battery has a closed-circuit voltage of at least about 1.5 Volts.

19. The battery of claim 1, wherein the battery has a current capability of up to about 20 amperes.

20. The battery of claim 1, wherein the anode comprises a lithium-aluminum alloy.

21. The battery of claim 1, wherein the electrolyte comprises a member selected from the group consisting of ethylene carbonate, propylene carbonate, 1,2-dimethoxyethane, and combinations thereof.

22. The battery of claim 1, wherein the fourth peak has intensity of 100 percent, and the second peak has an intensity of 57 percent.

23. The battery of claim 22, wherein the third peak has an intensity of 33 percent.

24. The battery of claim 22, wherein the first peak has an intensity of 24 percent.

25. The battery of claim 22, wherein the third peak has an intensity of 33 percent and the first peak has an intensity of 24 percent.

26. The battery of claim 1, wherein the fourth peak has an intensity of 100 percent, and the third peak has an intensity of 33 percent.

27. The battery of claim 26, wherein the second peak has an intensity of 57 percent.

28. The battery of claim 26, wherein the third peak has an intensity of 33 percent.

29. The battery of claim 26, wherein the second peak has an intensity of 57 percent and the third peak has an intensity of 33 percent.

30. The battery of claim 1, wherein the fourth peak has an intensity of 100 percent, and the third peak has an intensity of 33 percent.

31. The battery of claim 30, wherein the second peak has an intensity of 57 percent.

32. The battery of claim 30, wherein the first peak has an intensity of 24 percent.

33. The battery of claim 30, wherein the second peak has an intensity of 57 percent and the first peak has an intensity of 24 percent.

34. The battery of claim 1, wherein the X-ray diffraction pattern of the composition further includes a ninth peak at about 18 degrees.

35. The battery of claim 34, wherein the ninth peak is larger than the first peak.

36. The battery of claim 34, wherein the ninth peak is smaller than the third peak.

37. The battery of claim 34, wherein the ninth peak has an intensity of 34 percent.

\* \* \* \* \*

UNITED STATES PATENT AND TRADEMARK OFFICE
CERTIFICATE OF CORRECTION

| | | |
|---|---|---|
| PATENT NO. | : 8,003,254 B2 | Page 1 of 1 |
| APPLICATION NO. | : 10/951936 | |
| DATED | : August 23, 2011 | |
| INVENTOR(S) | : Todd E. Bofinger | |

It is certified that error appears in the above-identified patent and that said Letters Patent is hereby corrected as shown below:

Col. 20, Line 45, In Claim 2, delete "1.823 y≤2.0" and insert -- $1.8 \leq y \leq 2.0$ --, therefor.

Signed and Sealed this
Twenty-second Day of November, 2011

David J. Kappos
*Director of the United States Patent and Trademark Office*